(12) United States Patent
Johnson

(10) Patent No.: US 7,116,900 B2
(45) Date of Patent: *Oct. 3, 2006

(54) RADIANT ENERGY SOURCE SYSTEMS, DEVICES, AND METHODS CAPTURING, CONTROLLING, OR RECYCLING GAS FLOWS

(75) Inventor: Roger N. Johnson, Mercer Island, WA (US)

(73) Assignee: Radiant Optics, Inc., Woodinville, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/183,326

(22) Filed: Jul. 15, 2005

(65) Prior Publication Data

US 2006/0032490 A1 Feb. 16, 2006

Related U.S. Application Data

(63) Continuation-in-part of application No. 10/815,988, filed on Mar. 31, 2004, now Pat. No. 6,932,079.

(60) Provisional application No. 60/459,442, filed on Apr. 1, 2003.

(51) Int. Cl.
*A45D 20/40* (2006.01)
*F24C 7/00* (2006.01)

(52) U.S. Cl. ..................... 392/407; 126/92 B

(58) Field of Classification Search ............. None
See application file for complete search history.

(56) References Cited

U.S. PATENT DOCUMENTS

| 3,237,679 | A | 3/1966 | Best |
| 3,291,115 | A | 12/1966 | Fortini |
| 3,307,529 | A | 3/1967 | Fannon, Jr. et al. |
| 3,709,140 | A | 1/1973 | Rickhoff, Jr. |
| 4,480,628 | A | 11/1984 | Simpson |
| 4,569,657 | A | 2/1986 | Laspeyres |
| 4,639,213 | A | 1/1987 | Simpson |
| 4,722,681 | A | 2/1988 | Smith |
| 4,724,823 | A | 2/1988 | Simpson |
| 4,799,879 | A | 1/1989 | Laspeyres |
| 4,892,084 | A | 1/1990 | Fletcher |
| 4,900,245 | A | 2/1990 | Ahmady |

(Continued)

FOREIGN PATENT DOCUMENTS

CH 329290 4/1958

(Continued)

OTHER PUBLICATIONS

"Ceramic Infra-Red Generator at Solaronics, Inc.", http://www.thomasregister.com/olc/60040052/infred2b.htm, visited on Mar. 30, 2004, 1 page.

(Continued)

*Primary Examiner*—Thor S. Campbell
(74) *Attorney, Agent, or Firm*—Schwegman, Lundberg, Woessner & Kluth, P.A.

(57) ABSTRACT

This document discusses, among other things, systems, devices, and methods that increase radiant energy output, such as by using the waste airflow of combusted gas and/or ambient airflow resulting from convection, or by reducing or avoiding cooling effects of such airflows. In one example, the collected energy can be used to drive other secondary radiant sources or to preheat combustion air or ambient air. In another example, segmented secondary radiant sources are thermally isolated from each other to operate as a cross flow exchanger that exchanges thermal energy from a heated gas to a heated surface that provides radiant energy output. In a further example, a re-radiant membrane can separate the radiant source from the environment and/or reconfigure the effective shape of the primary radiant energy source.

32 Claims, 16 Drawing Sheets

U.S. PATENT DOCUMENTS

| | | | |
|---|---|---|---|
| 4,906,180 A | 3/1990 | Dvorak | |
| 5,046,944 A | 9/1991 | Smith | |
| 5,122,054 A | 6/1992 | Debacque et al. | |
| 5,139,415 A | 8/1992 | Schwank | |
| 5,165,887 A | 11/1992 | Ahmady | |
| 5,197,203 A | 3/1993 | Lenoir | |
| 5,462,431 A | 10/1995 | Ahmady | |
| 5,594,999 A | 1/1997 | Best | |
| D378,402 S | 3/1997 | Ahmady et al. | |
| 5,628,303 A | 5/1997 | Ahmady et al. | |
| 5,645,862 A | 7/1997 | Sable et al. | |
| 5,752,817 A | 5/1998 | Ahmady | |
| 6,088,930 A | 7/2000 | Robin et al. | |
| 6,098,614 A | 8/2000 | Fleming | |
| 6,289,603 B1 | 9/2001 | Lescanne et al. | |
| 6,932,079 B1 * | 8/2005 | Johnson | 126/92 B |
| 2004/0255927 A1 | 12/2004 | Johnson | |

FOREIGN PATENT DOCUMENTS

| | | |
|---|---|---|
| CH | 359861 | 1/1962 |
| DE | 2940801 A1 | 4/1981 |
| EP | 0162445 A2 | 11/1985 |
| EP | 0316130 A1 | 5/1989 |
| EP | 0514930 A2 | 11/1992 |
| EP | 1077348 A1 | 2/2001 |
| FR | 1206247 | 2/1960 |
| FR | 1283540 | 2/1962 |
| FR | 1447876 | 7/1966 |
| FR | 1509577 | 1/1968 |
| GB | 842596 | 7/1960 |
| GB | 2091869 A | 8/1982 |
| WO | WO-2004/090424 A2 | 10/2004 |
| WO | WO-2004/090424 A3 | 10/2004 |

OTHER PUBLICATIONS

"Combustion Chamber at Solaronics, Inc.", http://www.thomasregister.com/olc/60040052/infred3b.htm, visited on Mar. 30, 2004, 2 pages.

"High Intensity Infra-Red Reflectors at Solaronics, Inc.", http://www.thomasregister.com/olc/60040052/infred2c.htm, visited on Mar. 30, 2004, 2 pages.

"Solaronics Hi Intensity Infa-Red Heaters at Solaronics, Inc.", http://www.thomasregister.com/olc/60040052/infred2.htm, visited on Mar. 30, 2004, 1 page.

"Solaronics Suntube Low Intensity Heaters at Solaronics, Inc.", http://www.thomasregister.com/olc/60040052/infred3.htm, visited on Mar. 30, 2004, 2 pages.

"Suntube at Solaronics, Inc.", http://www.thomasregister.com/olc/60040052/infred3d.htm, visited on Mar. 30, 2004, 1 page.

* cited by examiner

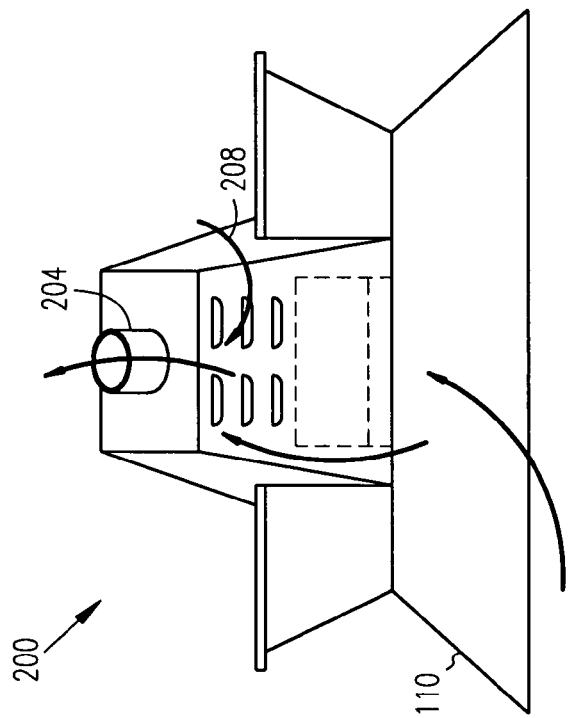
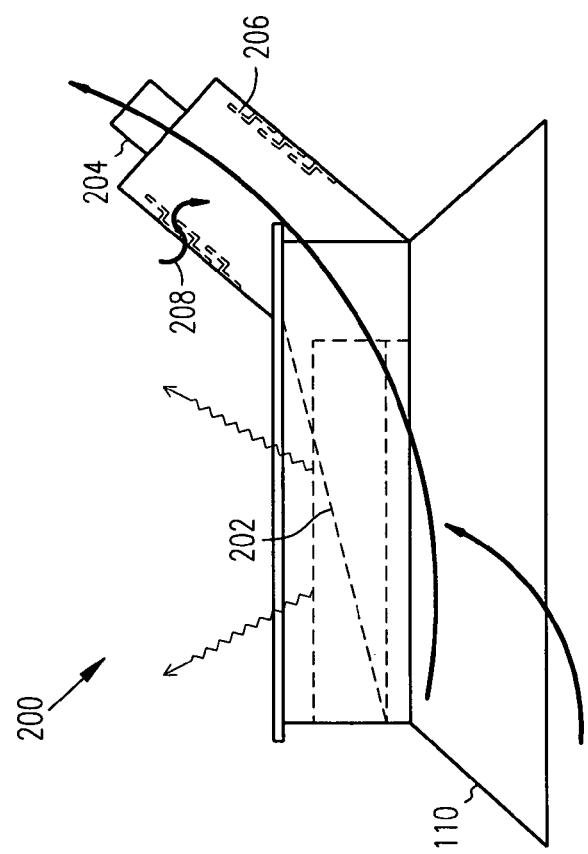
FIG. 2B
FIG. 2A

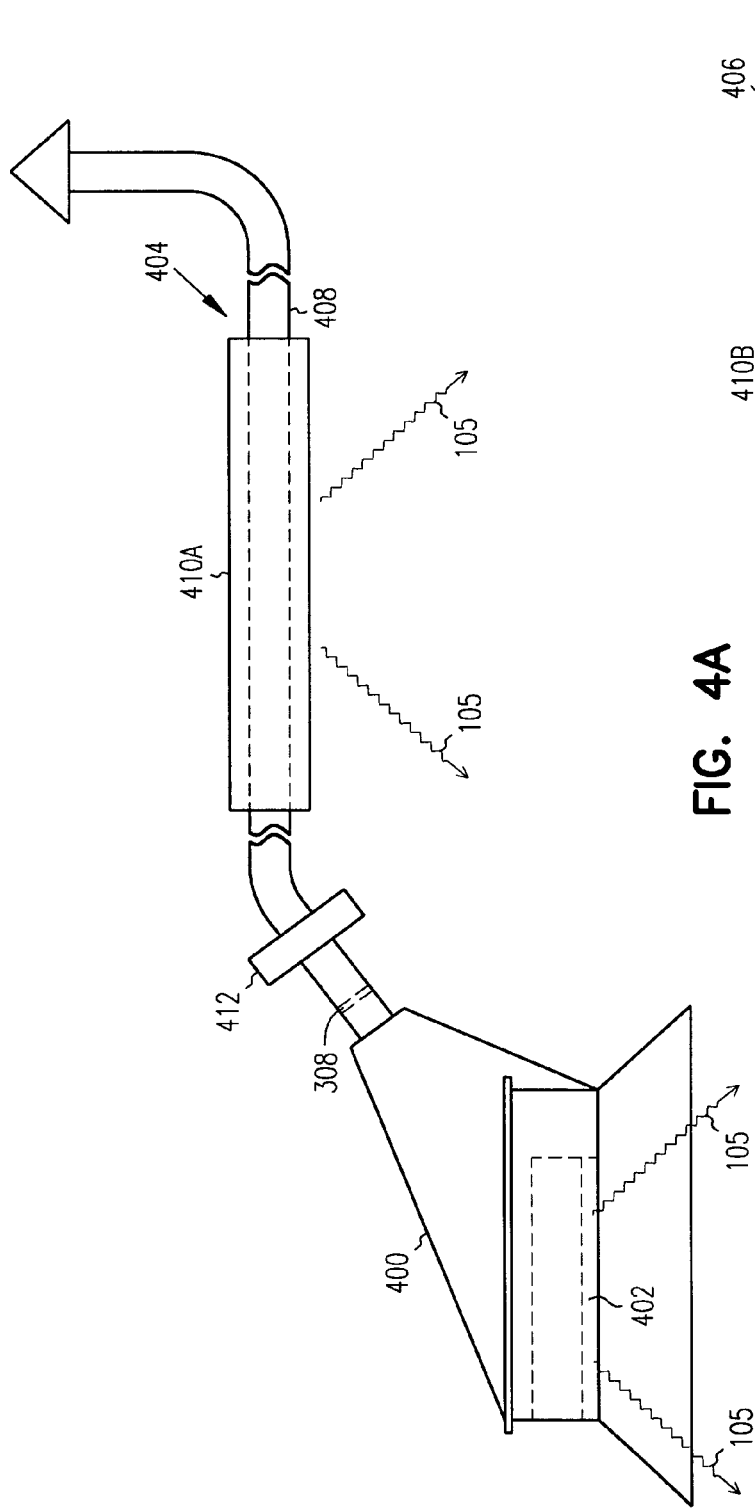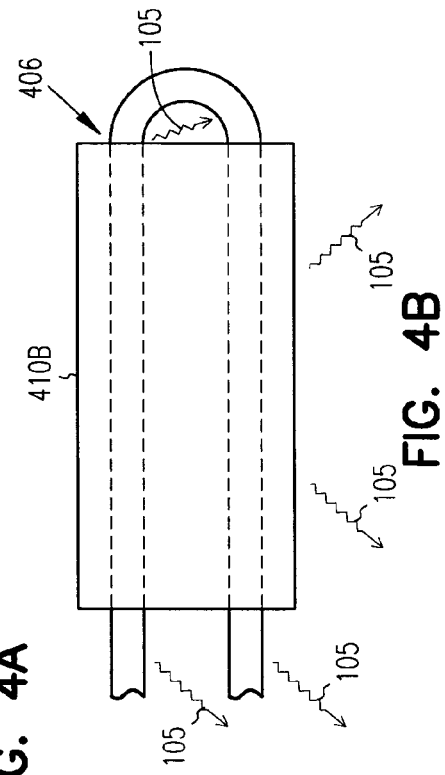

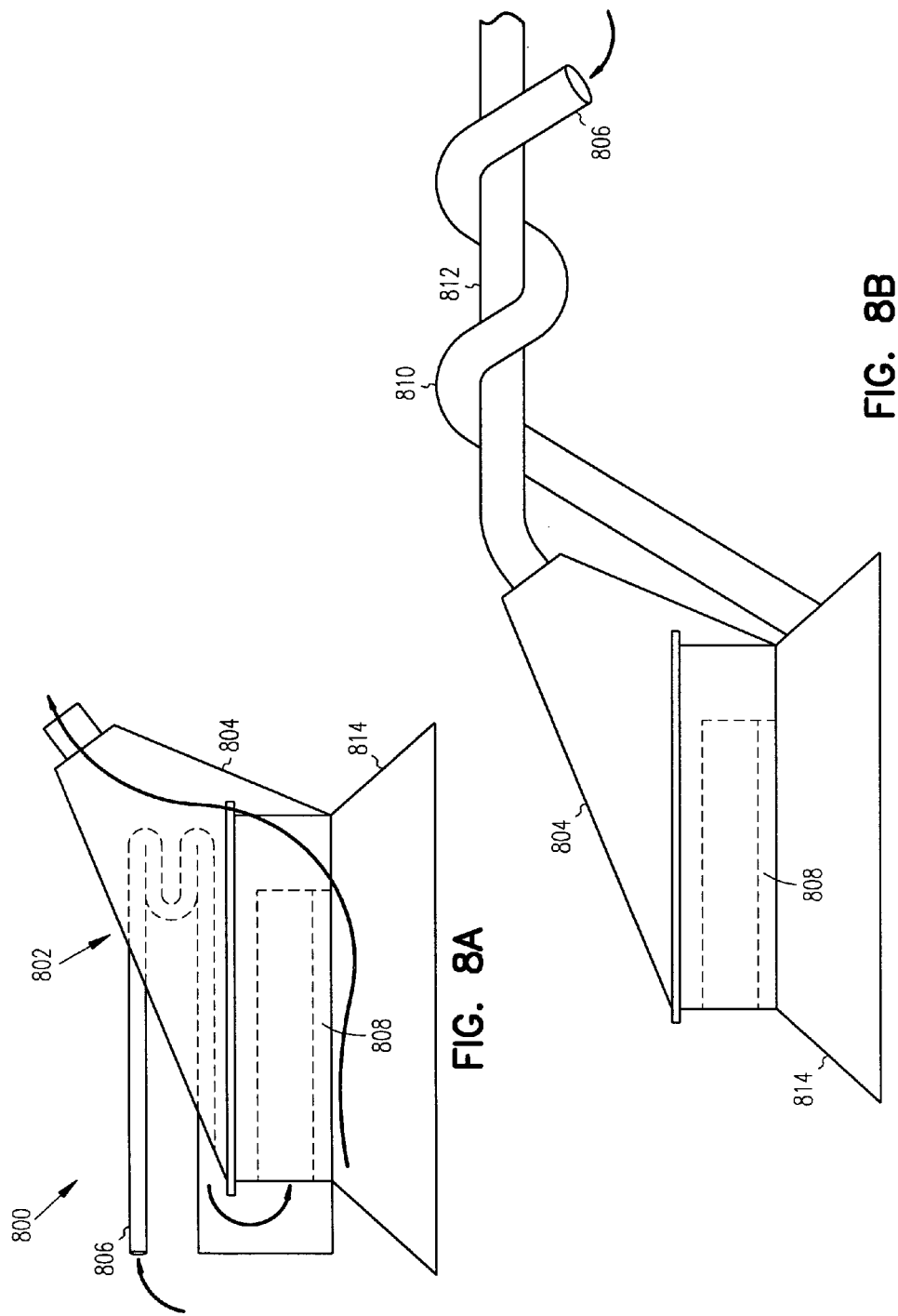

RADIANT ENERGY SOURCE SYSTEMS, DEVICES, AND METHODS CAPTURING, CONTROLLING, OR RECYCLING GAS FLOWS

CROSS-REFERENCE TO RELATED APPLICATION

This patent application is a Continuation-in-Part of U.S. application Ser. No. 10/815,988, entitled "Radiant Energy Source Systems, Devices, and Methods Capturing, Controlling, or Recycling Gas Flows", filed on Mar. 31, 2004 now U.S. Pat. No. 6,932,079, which claims the benefit of priority, under 35 U.S.C. Section 119(e), to U.S. Provisional Patent Application Ser. No. 60/459,442, entitled "Radiant Energy Source Systems, Devices, and Methods Capturing, Controlling, or Recycling Gas Flows," filed on Apr. 1, 2003. These applications are incorporated herein by reference.

TECHNICAL FIELD

This patent application pertains generally to radiant devices, and more particularly, but not by way of limitation, to radiant energy source systems, devices, and methods capturing, controlling, or recycling gas flows.

BACKGROUND

Radiant heaters convert gas, electric, or other non-radiant energy (e.g., energy stored in a fuel cell) into radiant energy. Other resulting non-radiant energy output (such as convective) diminishes heater efficiency. Other heater byproducts may contribute to air pollution. Existing radiant heaters have typically emphasized the primary radiant energy output. More particularly, they have typically disregarded the energy wasted by flue product gas flow (e.g., exhaust gasses produced from fuel combustion) and by other convective gas flow (e.g., movement of heated ambient air that results from both gas-fueled and electric-powered radiant heaters). Electric radiant heater products typically claim to be 100% efficient on the grounds that all the input electricity is converted into some sort of heat. Gas radiant heater products (such as tube heaters, for example) typically claim very high efficiency on the grounds that the wasted flue product includes low unburned chemical energy. However, existing radiant heaters unnecessarily waste an amount of radiant energy equal to the convective heat gain in the ambient and/or flue products. The present inventor has recognized a need for improving efficiency or other aspects of radiant heaters or other radiant energy systems.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

In the FIGS., dark lines with arrows represent airflows, and wavy lines with arrows represent radiant energy.

FIG. 2A illustrates a side view of a hood for collecting convectively-transported flue product from a radiant heater.

FIG. 2B illustrates an end view of a hood for collecting convectively-transported flue product from a radiant heater.

FIG. 4A illustrates an example in which a collection hood collects combustion or ambient convection gasses from a "primary" radiant heater and feeds the collected gasses into a "secondary" radiant heater.

FIG. 4B illustrates an example of a U-shaped "secondary" radiant heater fed by exhaust gasses from a "primary" radiant heater.

FIG. 8A depicts one example of a heater that includes a heat exchanger (e.g., under the exhaust hood) configured to preheat the intake air.

FIG. 8B illustrates another example of introducing preheated replacement air near the surface of the radiant element to replace the ambient heated air that convectively flows upward into the collection hood.

DETAILED DESCRIPTION

Figure 1A:
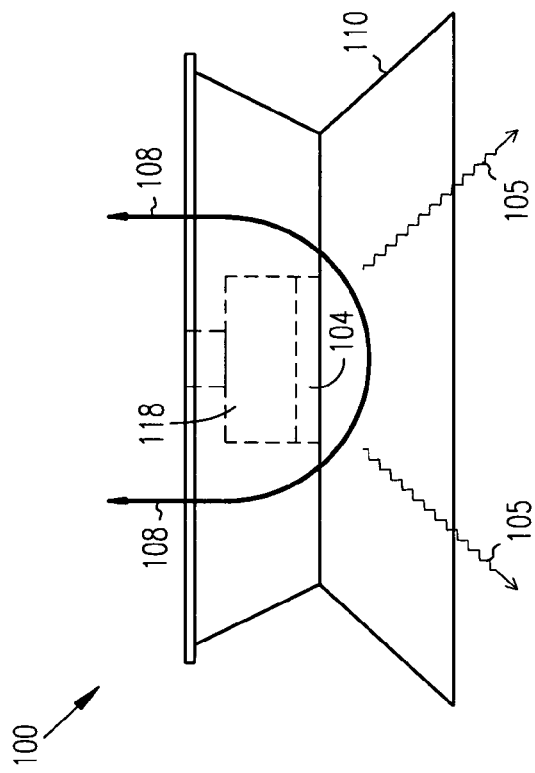
FIG. 1A is a side conceptualized view of a gas radiant heater.

In the following detailed description, reference is made to the accompanying drawings which form a part hereof, and in which is shown by way of illustration specific embodiments in which the invention may be practiced. These embodiments, which are also referred to herein as "examples," are described in sufficient detail to enable those skilled in the art to practice the invention, and it is to be understood that the embodiments may be combined, or that other embodiments may be utilized and that structural, logical and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated. Furthermore, all publications, patents, and patent documents referred to in this document are incorporated by reference herein in their entirety, as though individually incorporated by reference. In the event of inconsistent usages between this documents and those documents so incorporated by reference, the usage in the incorporated reference(s) should be considered supplementary to that of this document; for irreconcilable inconsistencies, the usage in this document controls.

1. Introduction

Radiant heaters convert gas, electric, or other non-radiant energy (e.g., energy stored in a fuel cell) into radiant energy. Other resulting non-radiant energy output (such as convective) diminishes heater efficiency but provides a resource for improved performance. Other heater byproducts may contribute to air pollution, which can be reduced by collecting the flue product for removal. The flue product is often quite hot. As a result, a "combustion clearance" distance is needed between the heater and combustible or cosmetic surfaces above the heater. This distance can be reduced by collecting and redistributing the flue product in a manner that does not degrade the radiant heater or its performance. Such implementations may be incorporated into the heater design or into a retrofit product used with an existing radiant heater. The cooling effect of ambient air against the face of the radiant unit can also be reduced in a number of ways, including stabilizing a layer of insulating air near the radiant surface. The heater's open flames burning its gas fuel (which otherwise would limit the locations where the heater can be installed) may be separated from the room being heated. This may be accomplished using a gas-impervious membrane, which passes the radiant energy, either transparently or by absorbing and re-radiating the radiant energy. Waste energy in the convective flow from a radiant heater may be recycled, such as to generate more radiant energy output, to preheat intake fuel and/or air to boost its final radiant surface temperature, or by using a heat exchanger to preheat fresh outside air that is drawn into a room such as to improve indoor air quality. Adding control membrane(s) about the radiant source may improve safety by separating the combustion zone from the local environment. Moreover, the shape of the radiant source may be modified using a re-radiant covering membrane, such as for improving an optical parameter.

Among other things, certain examples of the present systems, devices, and methods address the non-radiant byproduct of radiant energy sources, such as radiant heaters. Existing radiant heaters have typically emphasized the primary radiant energy output. More particularly, they have typically disregarded the energy wasted by flue product gas flow (e.g., exhaust gasses produced from fuel combustion) and by other convective gas flow (e.g., movement of heated ambient air that results from both gas-fueled and electric-powered radiant heaters). Electric radiant heater products typically claim to be 100% efficient on the grounds that all the input electricity is converted into some sort of heat—however, this does not necessarily mean that 100% of the input electricity is converted into radiant heat. Gas radiant heater products (such as tube heaters, for example) typically claim very high efficiency on the grounds that the wasted flue product includes low unburned chemical energy. However, existing radiant heaters unnecessarily waste an amount of radiant energy equal to the convective heat gain in the ambient or flue products.

This provides opportunities for improving radiant heater efficiency, such as by capturing, controlling, and/or recycling the ambient and/or flue convective gas streams created by operating the radiant heater. The present systems, devices, and methods may be used either to increase the effective radiant energy output of a radiant energy source, to mitigate any negative local environmental impact, or to provide additional heat to a room or other environment using otherwise wasted convective heat from the radiant heater. As the drawings suggest, many of the present designs described in this document can be implemented in a myriad of different useful combinations and permutations.

Radiant heaters are typically categorized according to the temperature of their radiant sources, e.g., as low temperature (<800 deg. F.), medium temperature (800–1600 deg. F.) and high temperature (>1600 deg. F.). Because radiant output per unit area changes as absolute temperature to the fourth power, these categories of temperature ranges represent radiant surface area differences of over 7 times. For example, radiating the same amount of energy from a 1600 deg. F. source requires about 1/7 the radiant surface area size of an 800 deg. F. source (in a convection-free environment). In practice, however, convective gas flow exists. Moreover, such convection typically results in an increasing penalty for larger area radiant surfaces because convective heat loss increases as the radiant surface area increases. Therefore, convection typically imposes limits on the practical radiant energy output, particularly for lower temperature radiant heater units.

Among other things, the present inventor has recognized that the efficiency of both electric and gas powered radiant heater units of any temperature may be increased by minimizing or reducing the cooling air that reaches the radiant energy source, such as by convective gas flow. The present inventor has also recognized, among other things, that efficiency can also be increased by capturing the convective stream of heated air, such as by using a device designed to radiate additional energy through another radiant source. This "secondary" radiant source may (but need not) operate at a reduced temperature and efficiency, but will still increase the overall efficiency of extracting radiant energy from the fuel source.

Moreover, the present inventor has recognized that, among other things, gas fueled radiant heaters provide an additional opportunity. Such gas radiant heaters generate radiant heat by combusting gas fuel mixed with intake air that includes oxygen. This combustion results in high temperature combustion exhaust gas. Such combustion exhaust gas typically includes combustion byproducts and inert gasses that came along for the ride. Reducing the temperature of this heated combustion exhaust gas using designs that ultimately shed this energy radiantly (or otherwise) raises the efficiency of such gas fueled radiant heaters. Reducing the temperature of this heated combustion exhaust gas also advantageously reduces any "combustion clearance" distance needed between the radiant heater and any nearby combustible surfaces or materials. For example, various techniques of capturing the flue stream are believed to allow a radiant heater to be hung within the clearance provided by the flue pipe (e.g., typically within about six inches of a ceiling), whereas if such flue stream were not captured, it is believed that the radiant heater would typically be hung about five times the flue clearance (e.g., about three feet away from the ceiling) to provide adequate combustion clearance.

The present document discusses, among other things, techniques for designing a good radiant heater. Such techniques include, among other things, increasing the surface temperature of the radiant element(s), reducing the ability of ambient air or exhaust gasses to cool the radiant element, and/or limiting the amount of intake air introduced into the combustion process used by gas radiant heaters. One technique for reducing this cooling air includes substantially matching the intake air flow to that needed by the gas combustion process. Another technique includes limiting the introduction of cooling air into the heater. This can be accomplished by providing a blanket or other region of substantially dry or still air (or other material) adjacent or near the face of the radiant element. A number of approaches are useful to minimize or reduce any resulting blocking of radiant energy output. For example, dry air is very transparent to radiant energy and, therefore, makes a good blanket near the radiant element. By contrast, combustion typically produces a damp air flue gas byproduct, and such wet air typically blocks more radiant energy than does dry air. Another example uses controlled airflow that provides a desired "bubble" of shielding transparent air in front of the radiant source. Yet another example provides an apparatus that stabilizes a layer of air adjacent or near the radiant face of the heater. In one such example, air movement near the radiant face of the heater is discouraged using an open cellular structure near the radiant face of the heater. In one example, the cellular structure includes cells that are small enough to discourage air movement. In another example, air movement near the radiant face of the heater is impeded by fine hairs, filaments, or the like stretched across and/or sprouting from the radiant face of the heater. Another example includes providing a separator to separate the opaque portions of flue product for removal, while preserving the presence of a stable layer of substantially transparent insulating dry air near the radiant element face. This document also describes designs that accommodate certain temperature constraints of the materials that are typically used in making certain portions of the heater.

In one example, the waste heat in the combustion flue product and/or the ambient convection flow is used for preheating, such as for preheating the combustion intake air, thereby boosting its final temperature. Increasing the temperature of the ambient operating environment of a radiant heater also increases the temperature and output of its radiant surface. For example, a radiant gas heater that breathes intake air preheated by 200 deg. F. will experience a significant rise in the radiant element surface temperature. Similarly, an electric radiant heater operating in an environment in which the air temperature is increased by 200 deg. F. will also experience a significant rise in the radiant element surface temperature A number of techniques may be used to accomplish such preheating. One example uses a heated cavity. One or more of the sides of the cavity operates as a radiant source, such as for preheating intake or ambient air. Another example uses one or more cross flow or other heat exchangers to extract heat, such as to preheat intake or ambient air. Certain designs will permit the heat exchanger to extract almost all of the heat from the exhaust flow stream. As an illustrative example, a good heat exchanger on a gas fueled radiant heater could potentially reduce the flue product temperature from the approximately 1800 deg. F. of the heated tile to about 800 deg. F. This extracted heat, in turn, would boost the intake air temperature by a good portion of the 1000 deg. F. of available heat energy that was extracted from the flue product. As a result, in this illustrative example, the final radiant element surface temperature could potentially be increased to above 2400 deg. F., which would increase the extraction of radiant energy from the fuel.

Radiant heaters sometimes use reflectors to direct the radiant output energy. However, the optical properties of most reflectors may degrade when the reflectors are allowed to get hot. Increasing the reflector temperature typically lowers its radiant reflectivity. For example, increasing the metal temperature of aluminum from 100 deg. F. to 500 deg. F. may increase its absorption of certain wavelengths of radiant energy by up to a factor of about three to five. The present inventor has recognized the desirability of raising the temperature on the radiant element surface while reducing the temperatures on any reflector surfaces. In one example, this is accomplished by providing cooling air behind the reflector (e.g., away from the radiant surface). In a further example, this is accomplished by increasing the ability of the reflector surface that is exposed to the radiant energy to provide energy radiantly. In one example, this includes tailoring or modifying the reflector material's emissivity to enhance reflection on the reflective front side (e.g., toward the radiant surface) or to enhance radiation from the reflector's backside better (e.g., away from the radiant heater element's surface). This may also be accomplished by designing the geometry of the one or more of the reflectors.

The numerous examples described in this document will permit many combinations and permutations. Moreover, these examples will be useful for both new radiant heater designs and to retrofit existing radiant heater equipment.

2. Overview

This document describes, among other things, various examples of improved radiant energy sources (such as radiant heaters) using capture, control, and/or recycling of gas flows. These examples include many configurations that can be used alone or in combination with each other, or with other systems, devices, and/or methods. These examples include, among other things, Convective Collector designs, Secondary Radiant Converter designs, Re-Radiant Barrier designs, and Transparent Gas Barrier designs.

A. Convective Collector (CC)

CC designs typically collect the flue product and/or ambient convective column of gas, which is typically present above the radiant heater, such as by using a collection hood located above the radiant heater. The CC may be included with a radiant heater or, alternatively, provided as an add-on to retrofit an existing radiant heater. In one example, the CC also exhausts or disposes of the collected gas. In another example, the CC uses the collected gas for preheating, such as to preheat the intake air entering a heater. In a further example, the CC is coupled to a secondary radiant converter (SRC), such as described below. The CC is driven either convectively or, alternatively, is power driven (e.g., using a powered vacuum or ventilation system).

CC designs offer numerous benefits, in some examples. For example, a CC design permits removal of flue product, such as to control air pollution. A CC design can also help meet or reduce a minimum distance required between the radiant source and a nearby combustible object. A CC design can also collect heated air such as for re-use elsewhere, such as to extract additional radiant energy, or to preheat combustion intake or ambient air. A CC design can also help control convective air, such as to increase heater performance.

In one example, a CC design tailors exhaust flow (e.g., using one or more exhaust pipe baffles) to just above that required by heater. The exact exhaust flow will depend on the particular chemical processes underlying the fuel combustion. This extracts more heat from the exhaust flow than if the exhaust flow rate is higher than required by the heater. In another example, the collection hood includes fresh air vents. This accommodates a blocked flue pipe or temperature constraints of heater or flue materials. A further example limits internal heat gain on the back of radiant heater, such as by diluting hot gasses with cooling air delivered to the back of the radiant heater. Yet another example limits internal heat gain on back of radiant heater, such as by designing the exhaust vent hood to reflect radiant energy away from the back of the heater. Examples of some CC designs are described and illustrated below.

B. Secondary Radiant Converter (SRC)

SRC designs typically tailor or modify one or more surfaces to become secondary radiant sources, such as due to their ducting of hot collected gas generated by a primary radiant heater source. In one example, this includes increasing the heat transfer to the surfaces and/or designing a particular surface geometry.

SRC designs offer numerous benefits, in some examples. In one example, an SRC extracts more radiant energy from the spent input energy than a design having only a primary radiant heater source. In another example, this increased efficiency is obtained using an SRC design extracts radiant energy using a cascading process, such as using segmented portions. One example increases radiance, such as by limiting convective cooling in the desired path of the radiant energy or by reducing radiant source size. Another example increases the gas heater intake air temperature for increasing the radiant element surface temperature. Another example uses a vacuum pump to help pull hot gasses from tube style or other heater, such as to assist in proper exhausting. A further example places a secondary radiant panel near or surrounding the high temperature radiant face before exhausting the flue product. This converts heat energy in flue product to radiant energy. Another example constructs the SRC as a tube heater mated to a high intensity radiant heater unit. A further example places a SRC device near or surrounding the high intensity panel. Examples of some SRC Designs are described and illustrated below.

C. Re-Radiant Barrier (RRB)

RRB designs typically incorporate a membrane or other barrier in front of or otherwise in the path of the radiant energy being provided by the primary radiant source. In one example, the RRB surface also provides a gas or flame barrier that can withstand the thermal conditions it experiences. The RRB surface absorbs radiant energy from the primary radiant source. This increases the temperature of the RRB, which then re-radiates energy. As a result, the RRB surface becomes the effective radiant source that is seen. In one example, the shape of the RRB is tailored or modified to enhance optical performance characteristics of the radiant heater as a whole. For example, the effective shape of the RRB may ease and/or enhance reflector design as compared to the shape of the original radiant energy source.

RRB designs offer numerous benefits, in some examples. In one example, the RRB design separates the open flame from the nearby environment. In another example, the RRB design allows or enhances operation in high wind environments. In yet another example, the RRB design is used to modify the effective radiant source shape to improve its performance. In a further example, the RRB design uses segmented or staged panels to extract more radiant energy from heated waste gas that would otherwise be possible using a single panel. In another example, the RRB design permits operating a high intensity radiant heater in combination with a medium/low intensity radiant heater.

One example uses a fiber-reinforced membrane barrier in front of gas heater radiant tiles and is ducted to exhaust. Another example uses a re-radiant barrier (RRB) to separate the flue gas from the ambient environment. In one example, the RRB is shaped differently from the primary radiant source to provide a different effective radiant shape. A further example uses small RRB cells near or directly attached to face of heater and ducted to exhaust. Yet a further example uses staged, segmented panels where each panel operates at (or is designed for) a different temperature waste gas flow. Examples of some RRB designs are described and illustrated below.

D. Transparent Gas Barrier (TGB)

TGB designs typically separate or isolate the radiant source from ambient space. This can be accomplished in a number of ways. In one example, a shielding gas (e.g., a body of air that is transparent to radiant heat) is introduced or stabilized near the face of the radiant heater. In one example, the transparent gas is stabilized using a "honeycomb" panel or other airflow-stabilizing structure. In one example, the airflow-stabilizing structure includes cells that are small enough to reduce or completely inhibit convective movement of the transparent gas near the face of the radiant heater element. In another example, a TGB includes mesh, screen, or the like that provides a barrier at least partially stabilizing the transparent gas without excessively blocking radiant energy from the radiant source. In yet another example, the TGB includes an arrangement of hairs, elongate members, and/or filaments, which, in one example, is attached to the face the TGB panel or to the radiant element.

TGB designs offer numerous benefits, in some examples. In one example, a TGB separates the flame area of a gas fueled radiant heater device from nearby ambient air. In another example, a TGB increases radiant output of the heater by reducing cooling effect of ambient flows.

In one example, a TGB introduces shielding gas to form a bubble in the radiant energy path. In another example, a TGB design controls the exit of heated gasses from the radiant heater unit to decrease or minimize cooling of the radiant source. Examples of some TGB designs are described and illustrated below.

3. Examples

Figure 1B:
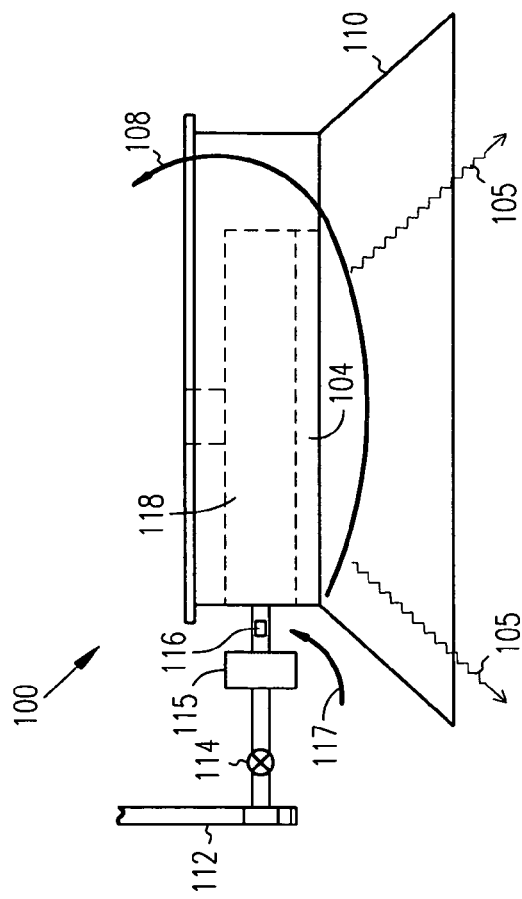
FIG. 1B is an end conceptualized view of the heater of FIG. 1A.
Figure 1D:
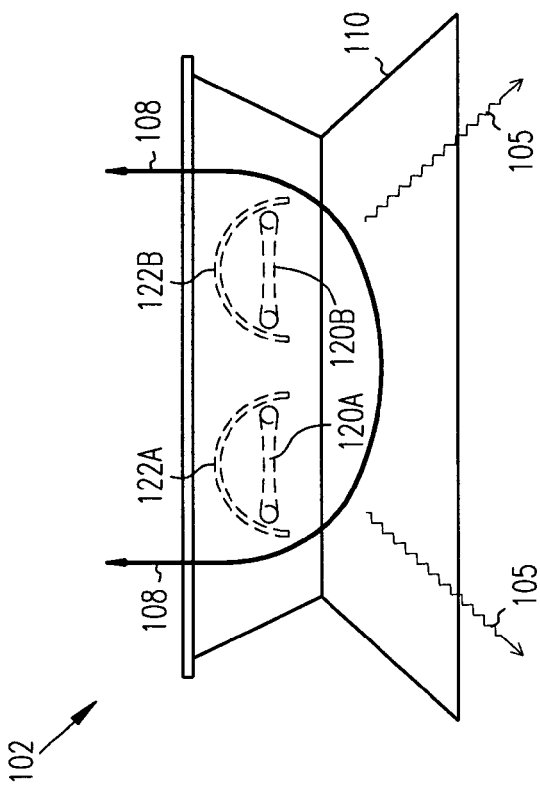
FIG. 1D is an end conceptualized view of the heater of FIG. 1C.
Figure 1C:
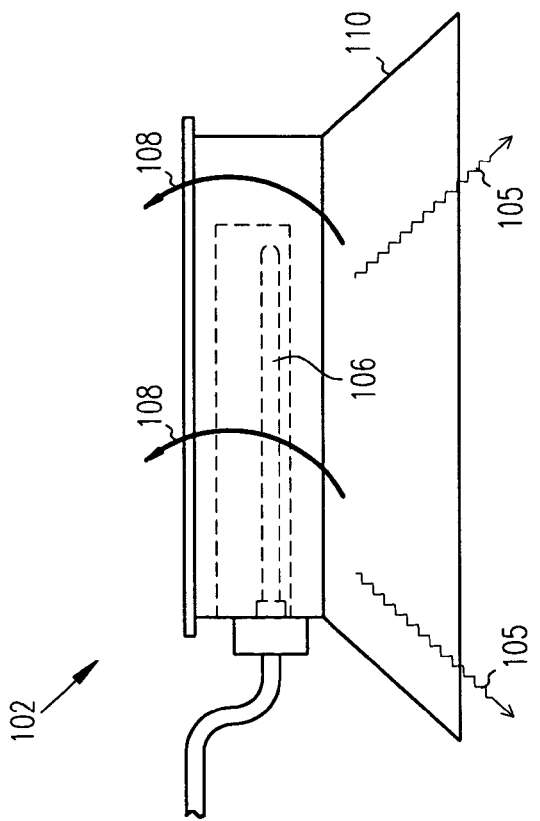
FIG. 1C is a side conceptualized view of an electric radiant heater.

FIGS. 1A, 1B, 1C, and 1D illustrate certain examples of gas and electric radiant heaters. FIG. 1A is a side conceptualized view of a gas radiant heater 100. FIG. 1B is an end conceptualized view of the gas radiant heater 100 of FIG. 1A. FIG. 1C is a side conceptualized view of an electric radiant heater 102. FIG. 1D is an end conceptualized view of the electric radiant heater 102 of FIG. 1C.

In respective FIGS. 1A and 1C, at least one gas powered radiant source 104 or at least one electric powered radiant source 106 that provides radiant energy IR 105 to heat a desired environment. The radiant heaters 100 and 102 also produce a convective exhaust flue gas stream F 108. The flue gas stream F 108 typically includes hot air that flows away convectively (and which is replaced by cooler ambient air that is drawn in by its wake) and, for the gas heater 100, also includes combustion exhaust products. In this example, a reflector R 110 helps direct the radiant energy output 105 in an intended direction. The radiant sources or radiant elements discussed in this document are typically designed to absorb and radiate—not to reflect—infrared heat energy. By contrast, the reflectors discussed in this document are typically designed to reflect—but not absorb and radiate—such infrared heat energy. In general, a good radiant element typically makes a poor reflector, and vice-versa.

The gas heater 100 in FIGS. 1A and 1B illustrates a conceptualization of a high intensity ported ceramic tile unit, but could be any combustion powered radiant heater that provides a hot radiating plate or other object, including a tube heater or a heater additionally or alternatively having lower temperature radiant panels. FIG. 1A illustrates a gas or other fuel supply 112 coupled by one or more valves (such as stop valve 114 or regulating valve 115) or the like to a venturi 116 or the like, where the fuel is mixed with intake air 117, such as for combustion by an ignition source. In the example of FIG. 1A, the gas powered radiant heater 110 includes a radiant source 104, such as porous radiant tiles, and a plenum chamber 118 for carrying the mixed air and fuel to the radiant tiles or other radiant source 104, where it is ignited by an ignition source, such as a pilot burner or electrode that is located close to the radiant source 104.

Exhaust flue gas F 108 typically escapes the plenum chamber 118 through pores in the radiant tiles or through an exhaust port or otherwise.

The electric heater 102 in FIGS. 1C and 1D depicts an example of at least one metal sheathed or other radiant electric element 106 as its radiant source. The example of FIG. 1D conceptualizes separate radiant electric elements 120A–B (although this is not required) that include corresponding respective individual element backside reflectors 122A–B as well as the larger side peripheral unit reflector R 110. The electric heater 102 may also be a quartz lamp, tube heater, or panel heater or the like. The quartz lamp, tube heater, or panel heater typically operate at different radiant-emissive surface temperatures from each other.

Figure 2D:
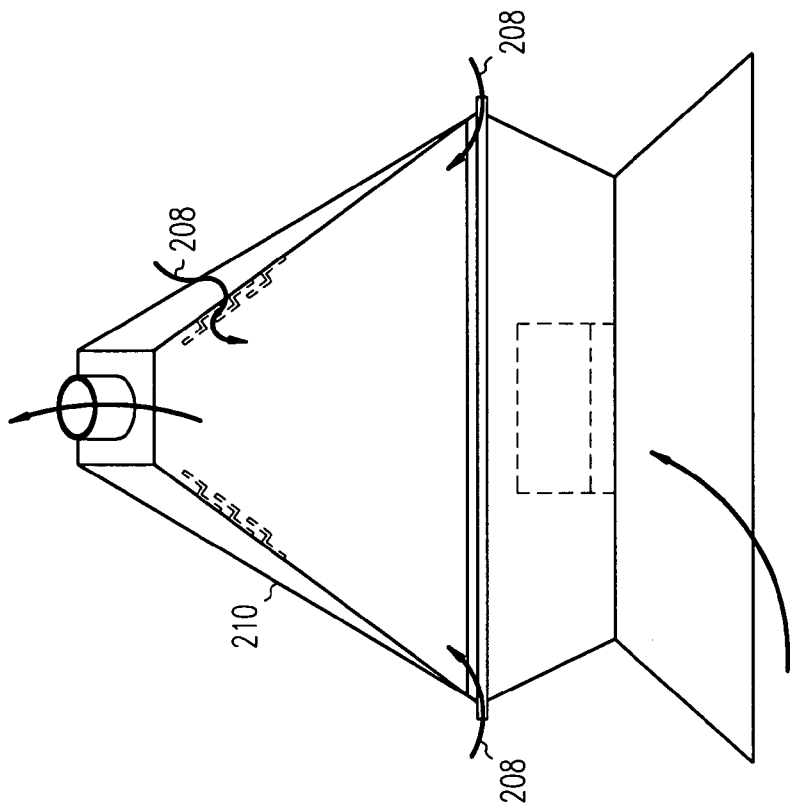
FIG. 2D illustrates an end view of a deeper hood (than in FIG. 2B) for collecting convectively-transported flue product from a radiant heater.

FIGS. 2A, 2B, 2C, and 2D illustrate various examples of hoods for collecting convectively-transported flue product from a gas heater 100 or an electric heater 102. FIG. 2A illustrates a side view, and FIG. 2B illustrates an end view, of a hood 200 or like device that plugs or otherwise partially or fully obstructs the flue exit areas of a radiant heater 100 or 102, such as by being positioned above or about the radiant heater 100 or 102. This example uses one or more generally inclined or other panels 202 that press or substantially seal (e.g., at 204) against the top or side of the heater 100 or 102 or radiant heater plenum chamber 118. This conducts the flue gas F 108, which may include combustion exhaust or ambient convection gas without combustion products, toward a collecting flue duct 204. In one example, one or more louvers L 206 or air introduction openings are arranged to bring cooling air C 208 into the hood. The cooling air C 208 limits the temperature gain on the radiant source 104 or other heater components that may not operate properly at excessive temperatures. The cooling air C 208 also accommodates any back pressure in the flue duct 204. This reduces the risk of overheating and damaging certain heater components and ensures safe combustion if the flue duct 204 becomes blocked.

Figure 2C:
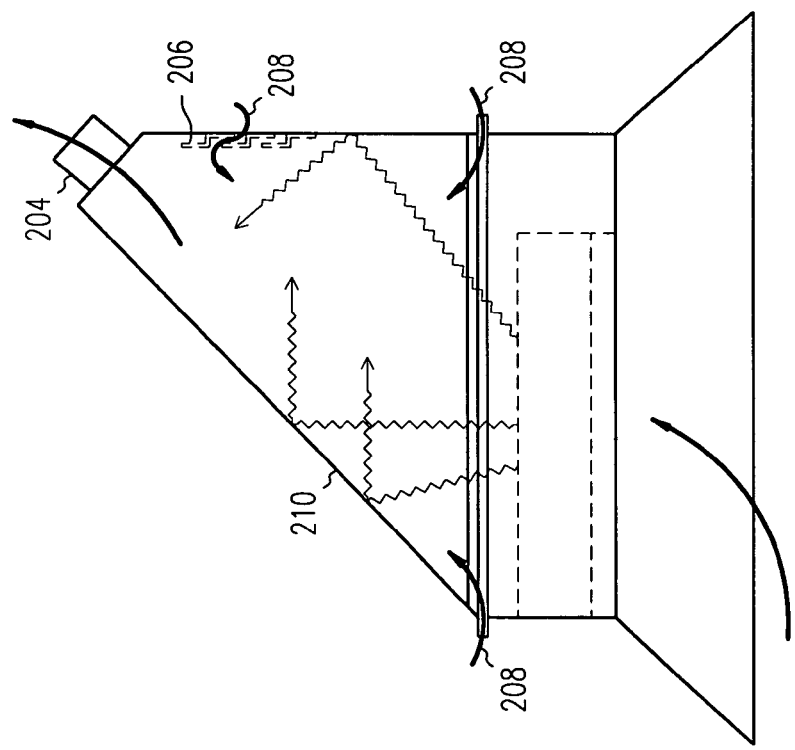
FIG. 2C illustrates a side view of a deeper hood (than in FIG. 2A) for collecting convectively-transported flue product from a radiant heater.

FIGS. 2C and 2D illustrate a deeper hood 210 (e.g., higher than FIGS. 2A and 2B), which, in one example, spans the entire back (top) of the heater, as illustrated in FIGS. 2C and 2D. In this example, louvers L 206 or other air introduction openings reduce the temperature gain on the radiant source 104 (or other temperature-limited elements of the heater) that might otherwise result from inclusion of the hood 210. The high angled sides of the hood 210 may also be designed to reflect heat horizontally or otherwise away from the gas radiant source 104 to help maintain the radiant source 104 below a desired maximum temperature.

Alternatively, if the radiant source 104 is designed to accommodate temperature increases resulting from hooding the exhaust gas flow, then the radiant source 104 and the hood 200 or 210 may also be used for preheating the plenum chamber 118, the intake air, or the radiant element 104 or the like, such as discussed above. The examples in FIGS. 2A–2D also apply to electric radiant heater units 102 and hooding their convective driven ambient air flows (which can also be described as exhaust airflows even without including combustion byproducts).

Figure 3:
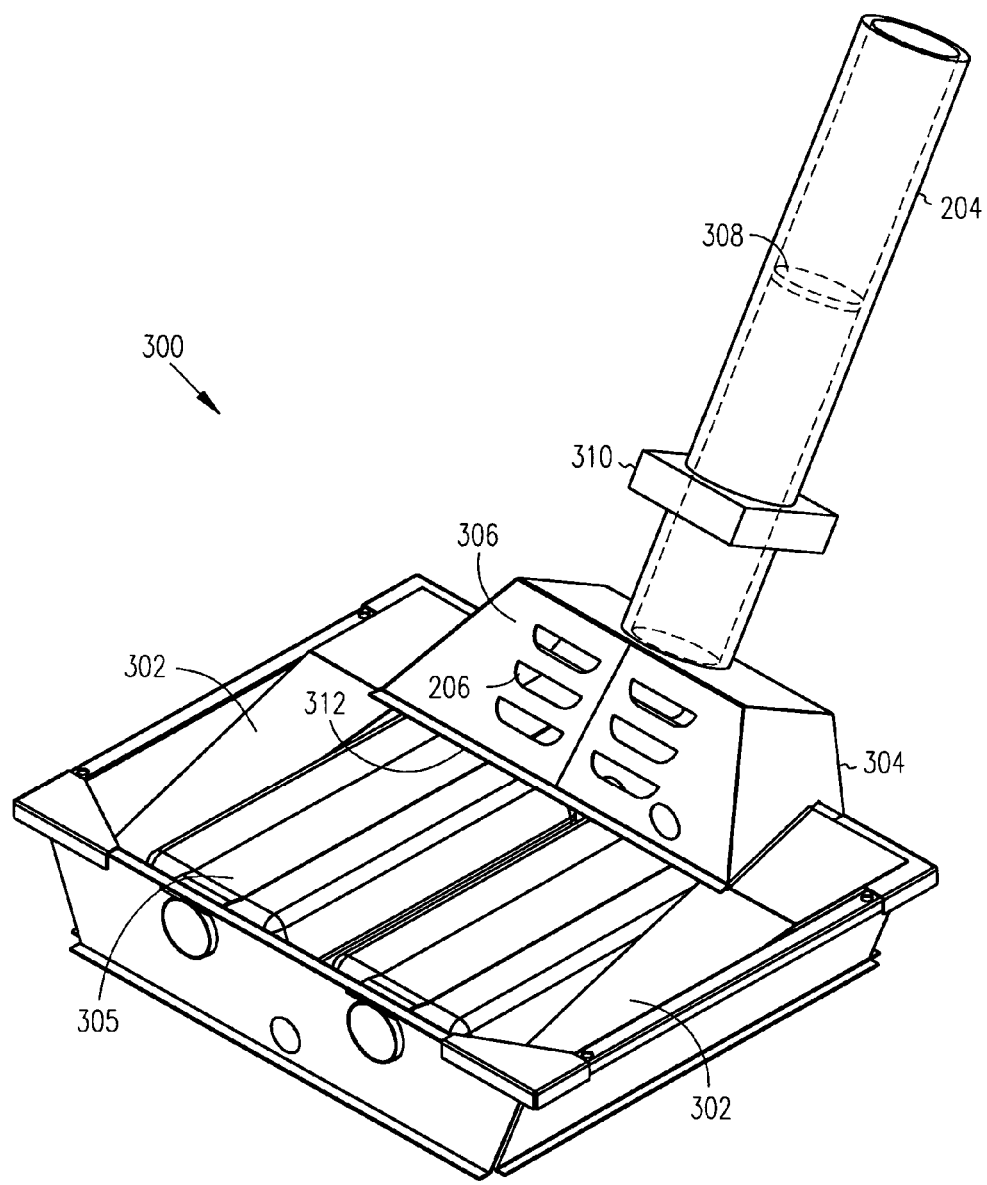
FIG. 3 illustrates an example of a collection hood in which side panels collect exhaust flue gas near the side areas of a radiant heater over or about which the hood is placed.

FIG. 3 illustrates an example of a collection hood 300 in which side panels 302 collect exhaust flue gas near the side areas of a radiant heater 100 or 102 over or about which the hood 300 is placed. In this example, the main body 304 of the hood 300 collects exhaust flue gas near the front of the radiant heater 100 or 102. The collected exhaust flue gas is steered toward the collecting flue duct 204. This example permits retrofitting to existing hanging radiant heater units 100 or 102. Such retrofitting is obtained by dropping the opening 305 of the hood 300 down on the top of the existing radiant heater unit 100 or 102. The collection hood 300 does not substantially interfere with the supporting chains by which the radiant heater 100 or 102 is typically hung from a ceiling. Louvers L 206 may optionally be included in the inclined top surface 306 of the main body 304 to introduce cooling air to the exhaust column. This lowers the temperature of the hood 300 or of certain temperature sensitive components (e.g., the radiant source 104) of the radiant heater 100 or 102. This also permits the hood 300 to spill accumulated exhaust gasses if the flue duct 204 becomes blocked. In one example, the flue duct 204 includes a damper or baffle B 308. The baffle 308 helps control the rate at which heated exhaust gasses leave through the flue duct 204, such as to increase the heat extracted from the departing exhaust gasses. In one example, such heat is extracted from the departing exhaust gasses by a heat exchanger 310 located around the flue duct 204, such as at a location below the baffle 308. In one example, the heat extracted by the heat exchanger 310 is used to increase the temperature of the radiant source 104 or 106, such as by using one or more preheating techniques. In one example, a small air gap A 312 is included, such as at or near a top edge of the gas heater 100 radiant source 104. In one example, the air gap A 312 helps cool the partially covered top edge of the gas heater 100. This helps keep the radiant source 104 within a desired operating temperature range for which it is designed. In the illustrated example, the side panels 302 include an inclined angled orientation. This helps direct the exhaust gas flow toward the main body 304 and the exit flue duct 204. This also reduces the risk of overheating on the side of the gas radiant source 104. Other techniques, such as a thermal insulation strip (e.g., located between the hood 300 and the gas radiant source 104) can also be used to reduce the risk of overheating the radiant source 104 by thermal energy in the hot exhaust gas stream being collected by the hood 300. The hood 300 example illustrated in FIG. 3 includes a main body 306 that is angled such that the exit flue duct 204 can exit vertically. This accommodates the most commonly installed existing heaters 100 and 102, however, the hood 300 could alternatively use an exit flue duct 204 providing a different exit angle.

FIGS. 4A and 4B illustrate an example in which a collection hood 400 collects combustion or ambient convection gasses from a "primary" radiant heater A 402, and feeds the collected gasses into a "secondary" radiant heater, such as the straight tube secondary heater B 404 or the U-shaped tube secondary heater D 406. The secondary radiant heater 404 or 406 typically operates at a lower intensity than the primary radiant heater 402. Some tube heaters combust the gas flowing through the tube heater pipe, IRp 408. In one example, such tube heater combustion obtains a 1000 deg. F. gas flowing in the pipe, IRp 408. The pipe 408, in turn, also radiates heat energy. This secondarily radiated heat energy is directed in a desired direction, such as by the top (backside) reflector R 410. In one example, convection feeds the gas collected by the hood 400 into the tube heater 404 or 406. In another example, a vacuum pump 412 is used to provide a vacuum that assists in collecting the gas using the hood 400 or transporting the collected gas through the tube 408. The vacuum pump 412 can be located between the hood 400 and the secondary heater 404 or 406 or beyond the secondary heater 406, if desired. In one vacuum-assisted implementation, a damper or baffle B 308 is used at the collection hood 400 to control the rate at which the collected gas flows through the secondary tube heater 404 or 406 for increasing the amount of heat that is extracted from the transported gas and converted into radiant energy. Either secondary heater 404 or 406 of FIG. 4A or 4B permits mating with other existing equipment (e.g., ductwork or piping for a tube heater system). In one example, the configuration depicted in FIGS. 4A and 4B uses a primary radiant heater 402 that employs a transparent gas barrier (TGB) or a re-radiant barrier (RRB), as discussed with respect to FIG. 9A and elsewhere in this document. This advantageously permits such a system to be substantially completed vented, mitigating or avoiding indoor air pollution to an extent not possible with prior art high intensity radiant heaters.

Figure 5:
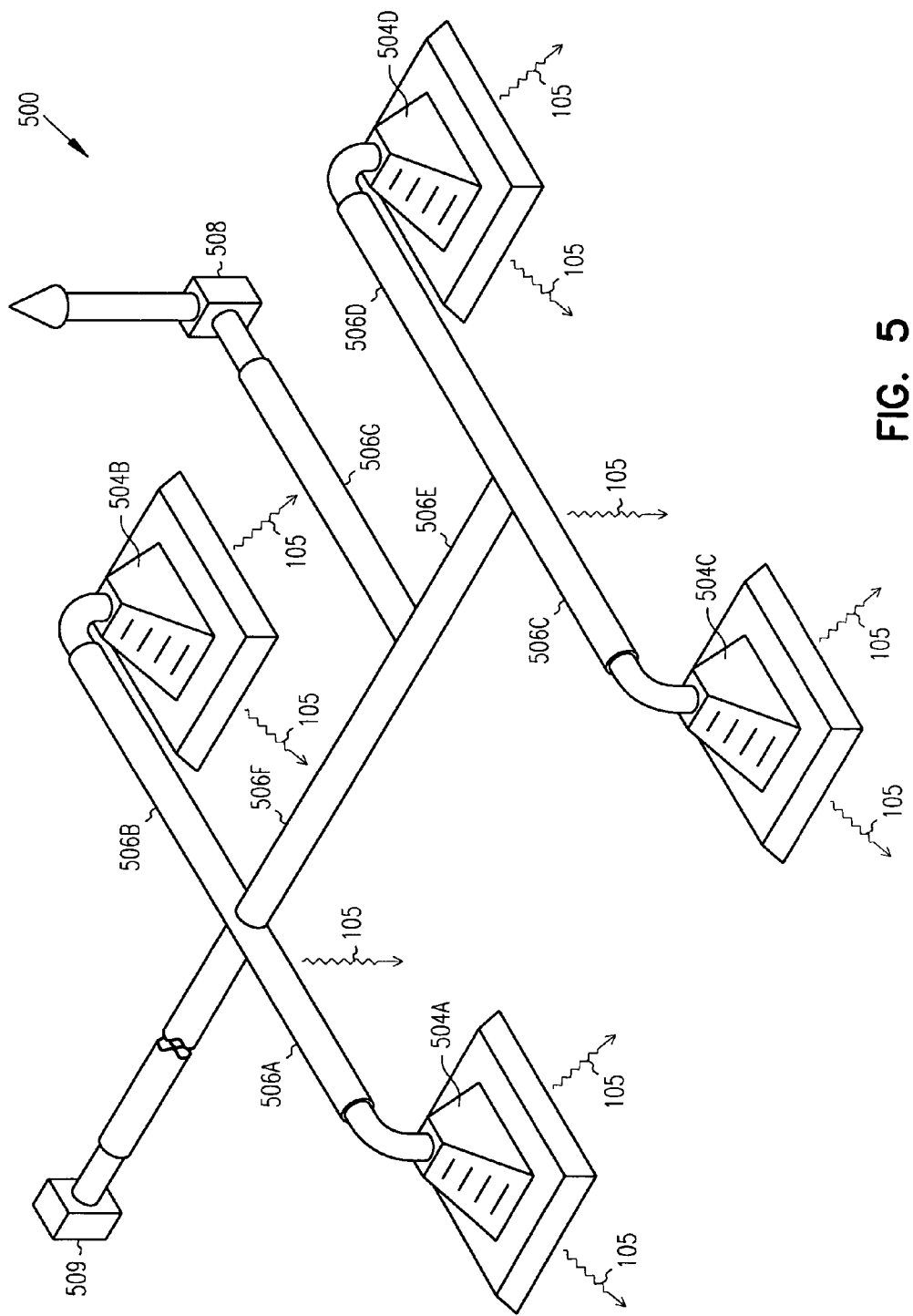
FIG. 5 illustrates an example of a system of any number of "primary" radiant heaters, including respective hoods to collect convection gasses that are fed into a system of any number of "secondary" tube or duct type radiant heaters to convert heat from the collected gasses into radiant energy before the gasses are exhausted.

FIG. 5 illustrates an example of a system 500 of any number of "primary" radiant heaters 502A–D, including (and hidden from view in FIG. 5) by respective hoods 504A–D to collect convection gasses that are fed into a system of any number of "secondary" tube or duct type radiant heaters 506A–G to convert heat from the collected gasses into radiant energy before the gasses are exhausted by a vacuum pump, Pv 508. The secondary tube or duct radiant heaters 506A–G may (but need not) be augmented by an auxiliary tube or duct heat source B 509. The primary radiant units 502A–D provide their direct radiant output while still generating all or most of the heat energy in the elevated temperature gas stream flowing within the tube or duct secondary radiant heaters 506A–G. In an alternative example, the tube or duct heat source B 509 is also implemented as a high intensity primary radiant heater 502. The example illustrated in FIG. 5 also applies to electric primary radiant heater units 102, e.g., feeding at least one common tube or duct secondary radiant heater 506, either convectively or assisted by a vacuum pump 508.

Figure 6A:
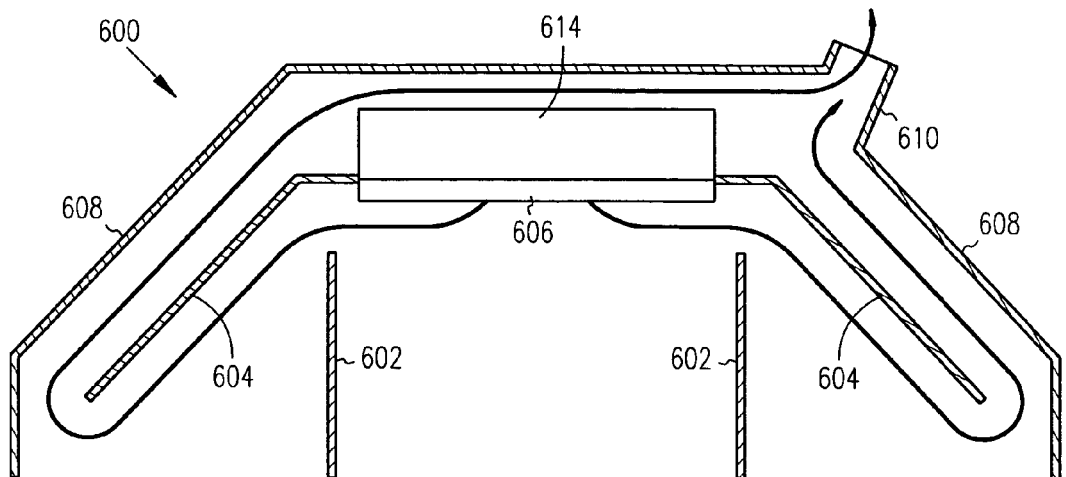
FIG. 6A illustrates a high intensity radiant heater unit in which the primary radiant reflector R has been modified, such as to enhance heating by hot convection gas flows from the same or a different radiant heater.
Figure 6B:
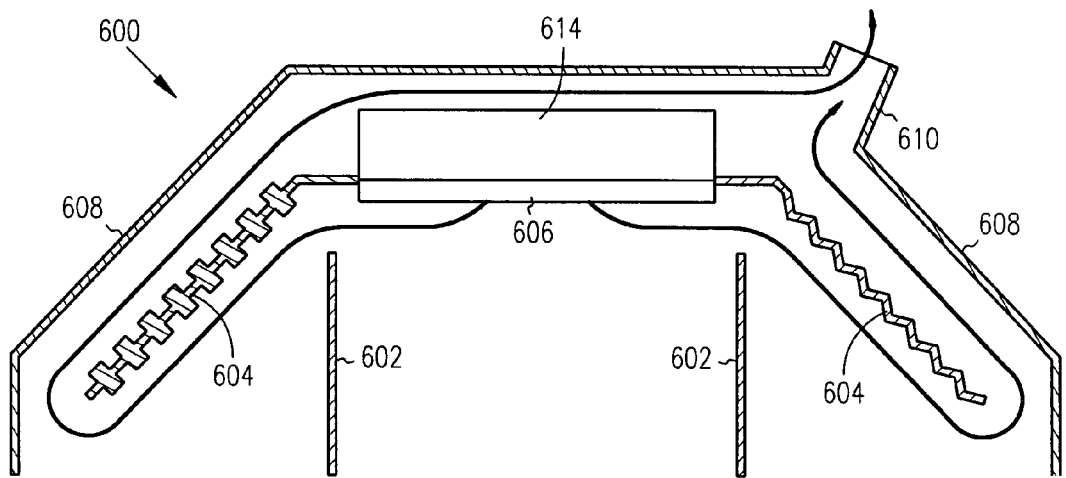
FIG. 6B shows a high intensity radiant heater in which the exhaust-flue-gas-heated secondary heating panels are configured so as to increase their absorption of heat.
Figure 6C:
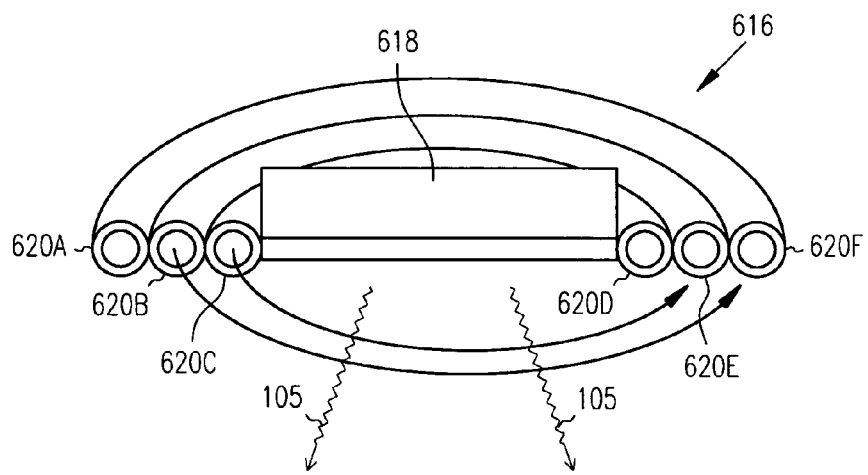
FIG. 6C illustrates an example of a heater that includes a high intensity circular primary radiant heater with exhaust-gas-heated secondary radiant heater tubes or panels arranged thereabout, such as in a surrounding spiral.

FIGS. 6A, 6B, and 6C illustrates examples of some variations on the tube or duct secondary radiant heater 506, however, such variations could also be applied to a primary radiant heater 100 or 102. The secondary radiant heater 600 is illustrated in FIG. 6A as a heated panel radiant heater, but it is understood that it could also radiate heat using tubes or ducts, such as described above. FIG. 6A illustrates a high intensity radiant heater unit 600 in which the primary radiant reflector R 602 has been modified, such as to enhance heating by hot convection gas flows from the same or a different radiant heater. In the example illustrated in FIG. 6A, a secondary radiant heating panel 604 projects downward and outward from the primary radiant energy source 606. In a gas heater 100, for example, combustion exhaust gasses exit downward through gaps between the radiant tiles forming the primary radiant energy source 606. Combustion exhaust and ambient convection flue gas flow is guided along the underside of the secondary heating panel 604, around the distal edge of the secondary heating panel 604, and back up the other side of the secondary heating panel 604 (e.g., constrained or guided by a hood 608 toward an exit such as at least one flue duct 610). The secondary heating panel 604 is heated by the thermal energy in the flue gas produced by the primary radiant energy source 606. Convection of such hot gasses increase the temperature of the secondary heating panel 604 to permit the secondary heating panel 604 to emit radiant energy. In this example, the vertical reflector R 602 separates the high intensity radiant energy $IR_1$ (from the high intensity primary radiant source 606) from the low intensity radiant energy $IR_2$ (from the low intensity secondary radiant source 604, i.e., the radiant portion of the flue-gas-heated panel). While such separation is not required, it permits the radiant energy output distribution to be separately adjusted as needed, such as by changing the shape of the reflector R 602. In one example, the exhaust gas is collected by the flue duct 610 and its heat is recycled, such as described above.

FIG. 6B shows a high intensity radiant heater 612 (similar to the high intensity radiant heater unit 600 of FIG. 6A) in which the exhaust-flue-gas-heated secondary heating panels 604 panels are configured so as to increase their absorption of heat, such as either or both of their front and backsides. In various examples, this is accomplished by adding ridges, fins, furrows, flutes, ripples, and or like features to one or both of the surfaces of at least one of secondary heating panels 604.

Moreover, the surfaces of at least one of secondary heating panels 604, or the features on the surfaces, can use variations in emissivity, such as to enhance reflection on one portion/feature of a surface (resulting in poor radiance) and to enhance radiance on another portion/feature of a surface (resulting in poor reflection). In the context of the example illustrated in FIG. 6B, in one embodiment, reflectivity is enhanced for those surfaces in view of the primary radiant source 606 (thereby increasing the reflected radiant energy received from the primary radiant source 606) and radiance is enhanced for those surfaces facing away from the primary radiant source 606 (thereby increasing the secondary radiant energy emission in a direction away from the primary radiant source 606). In a further example, some thermal insulation is included on or about the outside of the heated panel cavity 614 or the hood 608 (e.g., away from the primary radiant source 606) to limit the radiant and/or convective energy losses from those surfaces.

FIG. 6C illustrates an example of a heater 616 that includes a high intensity circular primary radiant heater 618 with exhaust-gas-heated secondary radiant heater tubes or panels 620A–F arranged thereabout, such as in a surrounding spiral. In one example, the exhaust gas produced by the primary radiant heater 618 is convectively pushed through the spiraled secondary radiant heater tubes 620A–F. In another example, the exhaust gas is pulled through the spiraled secondary radiant heater tubes 620A–F, such as assisted by a vacuum device, as described above. Alternatively, the heater 616 moves the exhaust gas using pressure/volume relations of the heated gas as it cools (by radiant energy loss from the spiral pipe 620). In one such example, the changing volume (along the spiral) of any one particular section of pipe requires the gas to occupy more volume or less volume, or else to move. Therefore, in one example, the direction of the gas flow is directed by using the designed shape of the pipe 620 or by using one or more one-way valves. In another example, the tendency of heated air to rise is used to force the flue gas to move through the radiant pipes 620 similarly to a wood stove in operation. In this mode, the spiral pipe 620 is capable of operating like a siphon to draw the heated exhaust gas along toward a cooler exit.

Figure 7A:
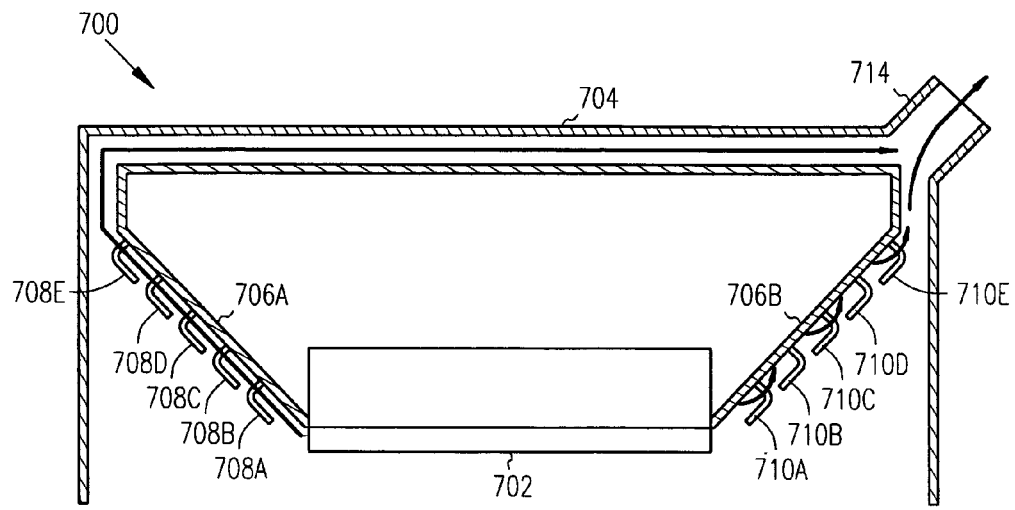
FIG. 7A illustrates an example of a high temperature radiant energy source with the hot flue exhaust gas cascading up across segments.
Figure 7B:
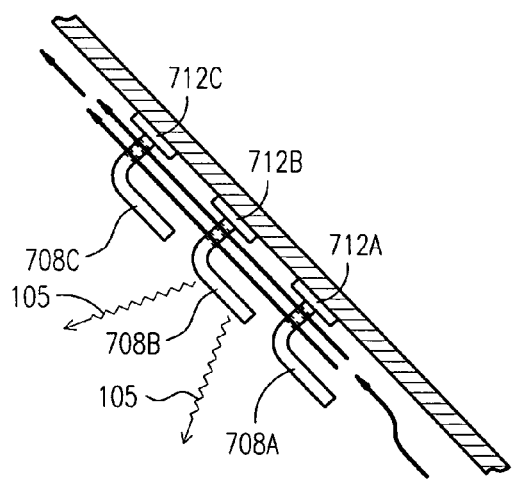
FIG. 7B illustrates a closer view of certain of the segments.
Figure 7C:
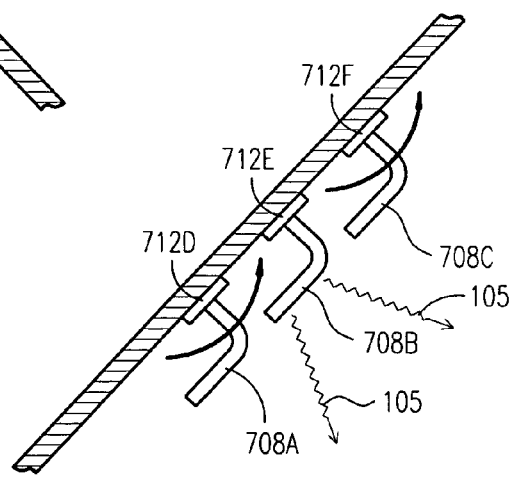
FIG. 7C illustrates a closer view of others of the segments.

FIGS. 7A, 7B, and 7C illustrate an example of a heater 700 that includes a primary heating source 702 and a hood 704. Inclined surfaces 706A–B are directed up and away from the primary heating source 702 toward the upper edges of sides of the hood 704. The inclined surfaces 706A–B include a number of angled or other surface segments 708 or 710 that can be raised to different temperatures, such as by using a heated gas flow that cascades across them, similar to a cross flow heat exchanger.

FIG. 7A illustrates an example of a high temperature radiant energy 702 source with the hot flue exhaust gas cascading up across the segments 708 or 710 (for illustrative purposes, the segments 708 are illustrated as having different shapes than the segments 710). In this example, each segment 708 or 710 is thermally insulated or thermally isolated from the adjacent segment 708 or 710.

FIG. 7B illustrates a closer view of the segments 708. In this example, the segments 708 are L-shaped strip segments, which may also include perforations that allow gas to pass between adjacent segments 708. In this example, the heated flue gas passing through such perforations in the segment 708A heats that particular segment 708A as the gas passes through to the next segment 708B. This raises the temperature of the segment 708A. Each segment 708 or 710 includes a face surface capable of providing resulting secondary radiant heating (e.g., in a direction down and away from the heater 700). Various heat sink techniques can be used to increase the heat absorption by individual segments 708 or 710.

FIG. 7C illustrates a closer view of the segments 710. In this example, the segments 710 do not include perforations. Instead, segments 710 act like waterway weirs. More particularly, in this example the hot gas takes turns flowing longitudinally along each strip-like segment 710 before cascading into the passage provided by the next segment 710. In one example, the strip segments 710 are slightly angled or otherwise arranged in a serpentine or like manner such that the gas flow moves slightly sideways along each segment 710, as in a maze.

The examples illustrated by FIGS. 7A, 7B, and 7C provide staged extraction of radiant energy using secondary radiant segments 708 or 710 that are thermally isolated from each other and, therefore, able to attain different final temperatures based on the characteristics by which they absorb convective energy and by which they emit resulting secondary radiant energy. The example of FIGS. 7A, 7B, and 7C also illustrates insulation 712 on the backside of the support plate (e.g., between each segment 708 or 710 and the inclined surfaces 706A or 706B to which they are attached). This reduces convective and radiant energy losses in undesired directions. Further, the example of FIGS. 7A, 7B, and 7C illustrates a vent 714 or other exhaust gas output collector in the hood 704 to collect the cooled gas flow and direct it to an exhaust flue or vacuum pump for removal. In a further example, the final outermost (i.e., most distant from the primary heating source 702) secondary radiant segment 708 or is configured to ensure that the spent gas flow is collected by the hood 704 and the vent 714. The membrane techniques described elsewhere in this document can also be used in the implementation illustrated in FIGS. 7A, 7B, and 7C, such as to further increase operating efficiency or venting capability.

FIGS. 8A and 8B illustrate examples of preheating combustion intake air or fuel, or preheating ambient air that flows toward the primary or secondary radiant heat source. Such preheating replaces heat lost by convectively exhausted air. The preheating typically increases the radiant operating efficiency. FIG. 8A depicts one example of a heater 800 that includes a heat exchanger 802 (e.g., under the exhaust hood 804). The heat exchanger 802 is configured to preheat the intake air 806 going into the combustion process (if enough heat is added to the intake air 806, however, the introduction of the gas fuel may have to be relocated to the actual combustion site to avoid autoignition elsewhere). Such preheating raises the final temperature of the surface of the radiant element 808.

FIG. 8B illustrates another example of introducing preheated replacement air near the surface of the radiant element 808 to replace the ambient heated air that convectively flows upward into the collection hood. Without such preheated replacement air, the convective flow would instead draw in cooler air that would cool the surface of the radiant element 808, reducing its efficiency. Therefore, the preheated replacement airflow increases the face temperature of the radiant element 808 by reducing the effect of the cooling convective air stream. Moreover, in this example, the preheated replacement airflow 806 is heated using waste heat, such as is obtainable from the exhaust gas flow collected by the hood 804. In the example of FIG. 8B, the preheated air is pushed (e.g., either convectively or using a blower or vacuum pump) into and through a pipe or duct 810 that is configured to receive heat from the exhaust gas, such as by being wrapped around or otherwise placed in association with the hood 804 or an exhaust duct 812. This preheated air is released and dispersed at or near a surface of the radiant element 808, such as around the lower edge of the heater's reflector 814. Releasing such preheated air increases efficiency where the radiant source is capable of operating at such higher temperatures and of obtaining higher efficiencies at such higher temperatures. In a further example, instead of preheating ambient air, ducted-in outside fresh air is preheated (e.g., using a heat exchanger) for obtaining such higher efficiency. The techniques described in FIG. 8B are merely illustrative examples of techniques for introducing preheated air near the surface of the radiant element surface 808, e.g., instead of attempting to stabilize airflow near the surface of the radiant element 808.

Figure 9A:
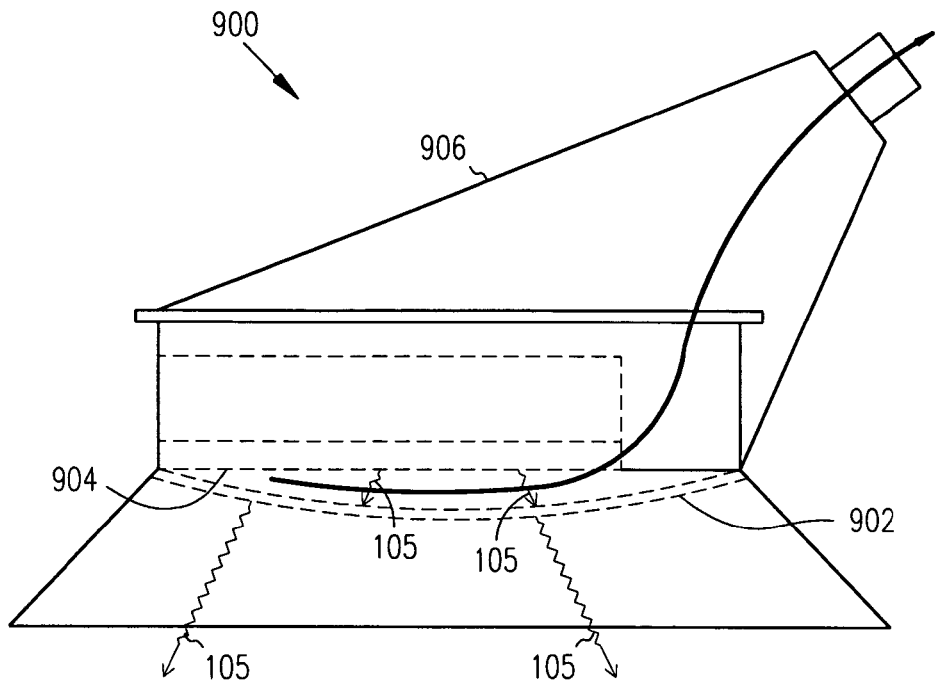
FIG. 9A illustrates an example of a heater that includes a re-radiant membrane or other barrier.
Figure 9B:
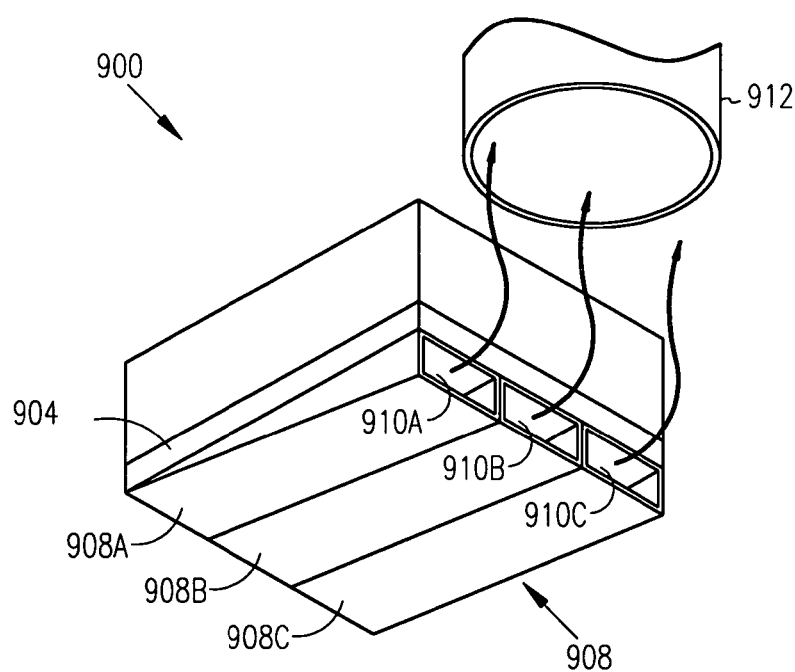
FIG. 9B depicts an example of a re-radiant barrier made in any number of small segments.

FIGS. 9A and 9B illustrate examples of a heater 900 that includes a re-radiant membrane 902 or other barrier that separates the combustion and/or primary radiant surface 904 from another environment, such as a room in which the heater 900 is located. The re-radiant membrane barrier 902 need not be transparent to the radiant energy provided by the primary radiant surface 904. In this example, the re-radiant membrane 902 is designed to impede, block, or guide convective gas flow (such as from the primary radiant surface 904 of the heater 900 into the collection hood 906) while receiving the direct radiant energy from the primary radiant surface 904. In certain examples, the re-radiant membrane 902 blocks substantially all flue gases from passing into the nearby heated environment, and instead guides such flue gases into the hood 906 for collection and exhausting to a different location, such as outside of a building in which the radiant heater is located.

In addition to improving exhaust venting, the re-radiant membrane barrier 902 rises in temperature until it radiates this energy from the side of the re-radiant membrane that is located away from the primary radiant surface 904. In the illustrated example, the re-radiant membrane 902 includes thermal characteristics that permit the re-radiant membrane 902 to span the face of the heater 900 (as shown in the example of FIG. 9A) or a portion thereof. In this example, the re-radiant membrane 902 is hung from or otherwise attached to the edges of the radiant heater 900 or its collection hood 906. In another example, the re-radiant membrane 902 uses a fiber-reinforced composite or like material that provides enough rigidity to obtain a desired three dimensional shape.

FIG. 9B depicts an example of a re-radiant membrane 908 made in any number of small segments 908A–C. This provides strength and ease of fabrication. In one example, the segments 908A–C are attached directly to the face of the primary radiant surface 904. The exhaust outputs 910A–C of all the sections 908A–C are operatively coupled at the exit side (e.g., by a hood 906 or otherwise) to a combined flue gas collection duct 912. In one example, the segments 908A–C are tapered to provide ducting that increases in size as it approaches the exit side, such as to accommodate greater total exhaust gas flow near the exit toward the flue gas collection duct 912.

Figure 10A:
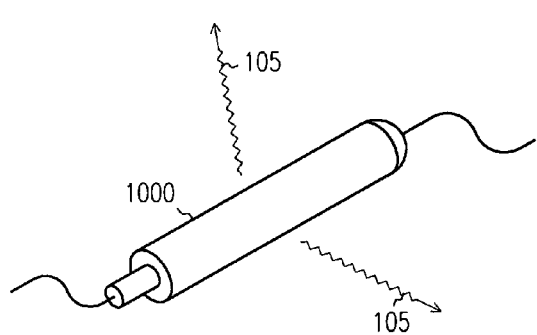
FIG. 10A illustrates an example in which a heated rod radiant heater element.
Figure 10B:
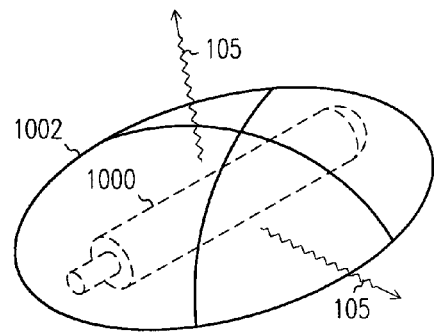
FIG. 10B illustrates an example in which the heated rod radiant heater element of FIG. 10A is effectively transformed into a hemispherical shape when covered by or positioned near a hemispherical re-radiant barrier.

FIGS. 10A, 10B, 10C, 10D, and 10E illustrate various examples in which the shape of the re-radiant membrane or other barrier is deliberately configured, modified, or tailored for one or more a variety of reasons. In one example, the re-radiant membrane is shaped to change the effective shape of the primary radiant heater source, such as to improve or optimize optical or thermal characteristics, as needed. FIG. 10A illustrates an example in which a heated rod 1000 radiant heater element. The heated rod 1000 radiant heater element is effectively transformed into a hemispherical shape when covered by or positioned near a hemispherical re-radiant membrane 1002, as illustrated in FIG. 10B. In certain circumstances, the particular re-radiant barrier morphology may reduce cooling of the primary radiant heater source. In other examples, the effective re-radiant barrier shape may present a more efficient or otherwise better radiant source shape, than the primary radiant heater element, such as to a reflector or lens system arranged about the primary radiant heater element.

In other examples, the re-radiant membrane is configured to resonate at a frequency that is substantially tailored to increase or maximize the absorption of radiated energy into the desired target. To illustrate, a glowing gas lantern mantel advantageously converts some of the energy of the combustion process into more light than a hot surface alone would produce. Similarly, in an example in which the present radiant heater is fitted with a secondary re-radiant barrier, that would normally provide an output radiant energy frequency profile that is similar to that of the primary radiant source. However, in another example in which the secondary re-radiant barrier is modified with one or more of a variety of dopants (e.g., similar to those dopants used in a lantern mantel), a more useful frequency profile of radiant energy output can be provided. Certain radiant energy emitters can be thermally excited by direct contact with a flame. Such emitters may include, among other materials, a substantially transparent magnesium oxide membrane doped with one or more of a variety of nickel or colbalt oxides. Tailoring the re-radiant frequency of a secondary re-radiant barrier that blocks or guides exhaust products toward a flue duct advantageously provides the dual ability to separate combustion products from a heated area while improving radiant function. Such resonance of the re-radiant barrier element may be obtained by coating or forming the secondary (re-radiant) element with selenium or other suitable material to provide the desired re-radiant frequency tailoring.

Figure 10C:
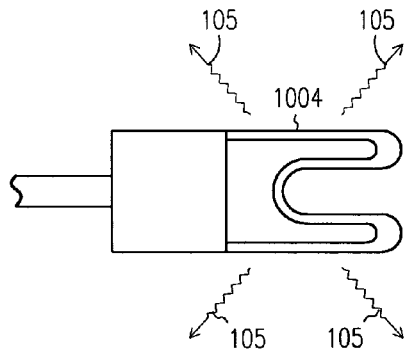
FIG. 10C depicts one example of an igniter tip or other element.
Figure 10D:
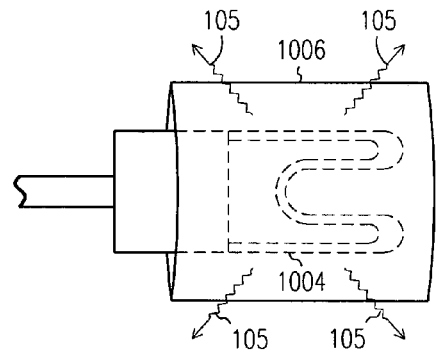
FIG. 10D illustrates an example in which the igniter tip or other element of FIG. 10C is at least partially introduced into or covered with a substantially rectangular re-radiant barrier to provide a substantially rectangular effective re-radiant energy source.

FIG. 10C depicts one example of a silicon carbide (SiC) or other igniter tip or element 1004. The igniter tip or element 1004 is at least partially introduced into or covered with a substantially rectangular re-radiant jacket barrier 1006 to provide a substantially rectangular effective re-radiant energy source, as illustrated in FIG. 10D.

Figure 10E:
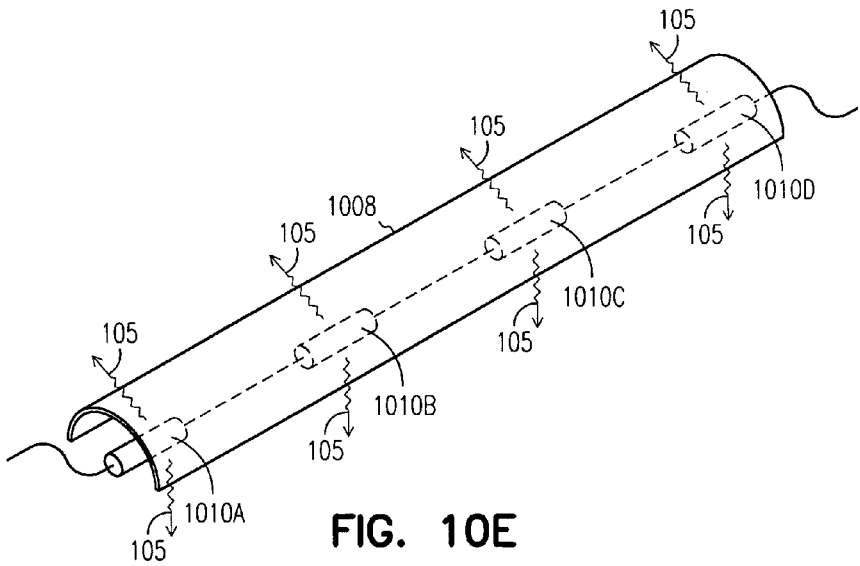
FIG. 10E depicts an example of a half cylinder re-radiant membrane barrier that provides an even re-radiant energy output even though the primary radiant heater source is segmented into separate primary radiant elements.

FIG. 10E depicts an example of a half cylinder re-radiant membrane barrier 1008 that provides an even re-radiant energy output even though the primary radiant heater source 1010 is segmented into separate primary radiant elements 1010A–D.

FIGS. 11A, 11B, 11C, 11D, and 11E illustrate various examples of airflow inhibitors. Such airflow inhibitors increase heater efficiency by reducing radiant source element cooling by cool airflows drawn in by convection of heated gasses away from the radiant source element. Among other things, the inhibitor obstructs or prevents cooling air flows to the heated primary radiant surface. In certain examples, the airflow inhibitors provide a high degree of transparency to the radiant energy received from the primary radiant energy source, unlike the re-radiant barriers described above.

Figure 11A:
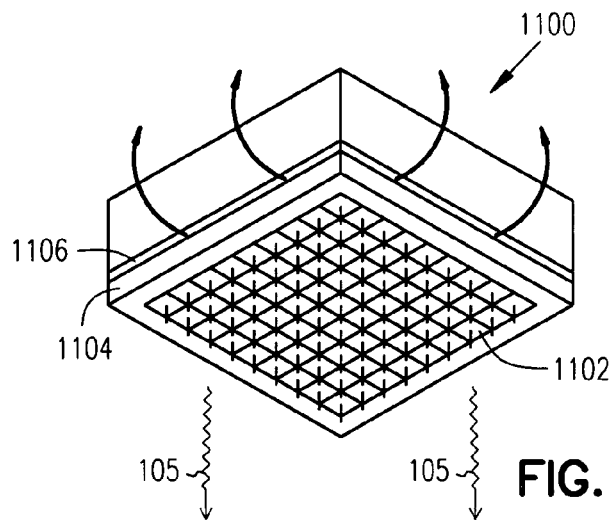
FIG. 11A illustrates one example of heater that includes an airflow inhibitor that is implemented as a honeycomb-style or other cell-like structure positioned in front of the heater's primary radiant source.

FIG. 11A illustrates one example of heater 1100 that includes an airflow inhibitor 1102 that is implemented as a honeycomb-style or other cell-like array (or unordered cell-like structure) positioned in front of the heater's primary radiant source 1104. In this example, an air gap 1106 has been left between the radiant source 1104 and the airflow inhibitor 1102. The air gap 1106 permits extraction of the damp combustion by-product air from the front of the primary radiant source 1104. This is desirable because such wet air absorbs infrared radiant energy, and although wet air also re-radiates infrared radiant energy, too much wet air in front of the primary radiant source 1104 may block more radiant energy from the radiant source than is re-radiated by the presence of such wet air. The airflow inhibitor 1102 preserves a layer of relatively more still air in its cells, which have substantially vertical cell walls. In this example, these cells are typically small enough to resist gross air movement or to reduce or avoid air circulation within the cells. In one example, these effects are obtained by using cell widths of less than one half inch. Though both reflective and absorptive cell walls work for inhibiting airflow, reflective walls typically operate cooler and, therefore, don't create as much convective airflow.

Figure 11B:
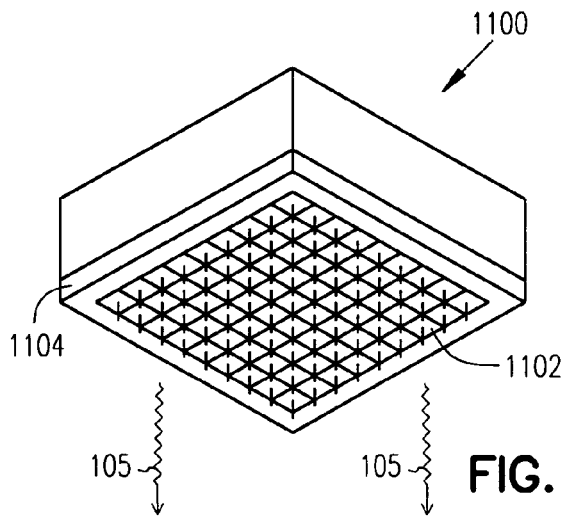
FIG. 11B illustrates the airflow inhibitor cell-like structure in direct contact with the radiant face of the radiant heater source.

FIG. 11B illustrates the airflow inhibitor 1102 cell array in direct contact with the face of the radiant heater source 1104. This allows effective thermal blanketing of the radiant heater source 1004 while allowing the radiant energy to pass.

Figure 11C:
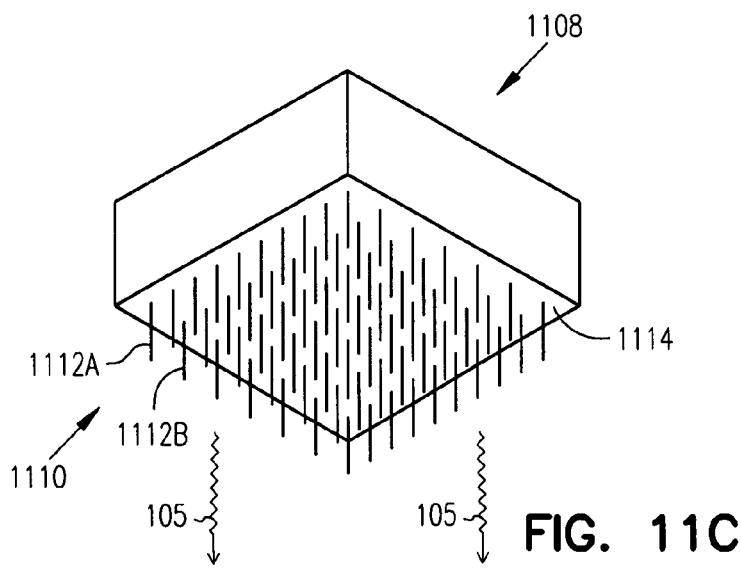
FIG. 11C depicts an example of a heater that includes an airflow inhibitor that includes an array or other arrangement of fibers (or the like) protruding from the face of the radiant heater source.

FIG. 11C depicts an example of a heater 1108 that includes an airflow inhibitor 1110 that includes an array or other arrangement of fibers 1112 (or the like) protruding from the face of the radiant heater source 1114. In one example, this arrangement of fibers 1112 includes a fiber density and fiber length designed to obtain a desired temperature gain of the radiant surface 1114, during operation, over that which would otherwise be obtained without the airflow inhibitor 1110. The fibers 1112 may be opaque or transparent to the radiant energy emitted by the radiant surface 1114. Using such an airflow inhibitor 1110, only the most extreme peripheral edge of the radiant surface 1114 will experience any substantial convective heat losses.

Figure 11D:
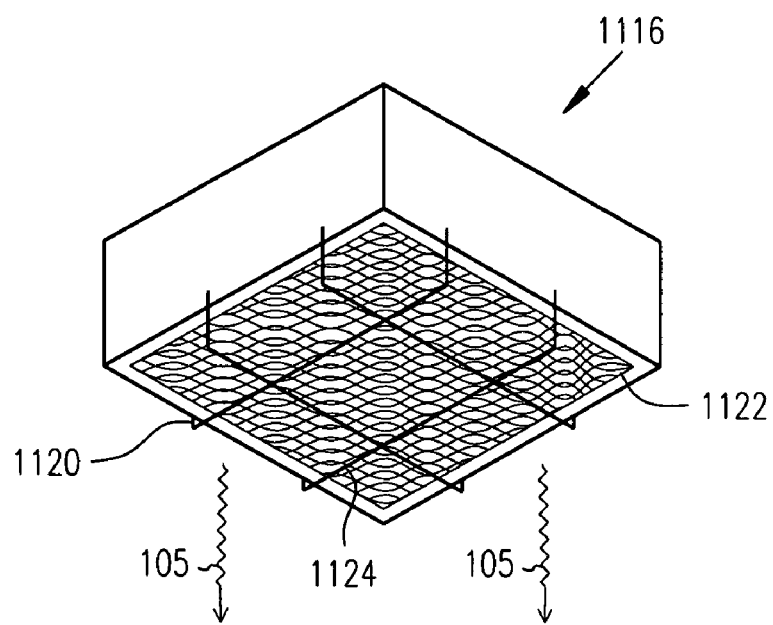
FIG. 11D conceptually depicts an example of a heater having an airflow inhibitor with a woven or other mat or body of fibers, which are typically transparent to the radiant energy source.

FIG. 11D conceptually depicts an example of a heater 1116 having an airflow inhibitor 1118 with a woven or other mat or body of fibers 1120, which are transparent to the radiant energy source 1122. In this example, the body of fibers 1120 is held against the face of the radiant energy source 1122, such as by a few wire-like or other retainer members 1124.

Figure 11E:
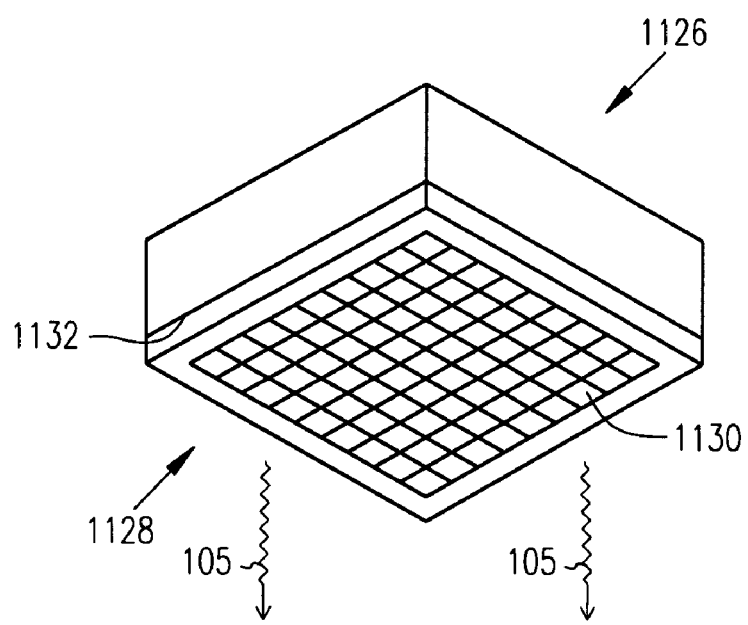
FIG. 11E depicts an example of a heater having an airflow inhibitor that includes a screen positioned in front of a radiant element surface.
Figure 12A:
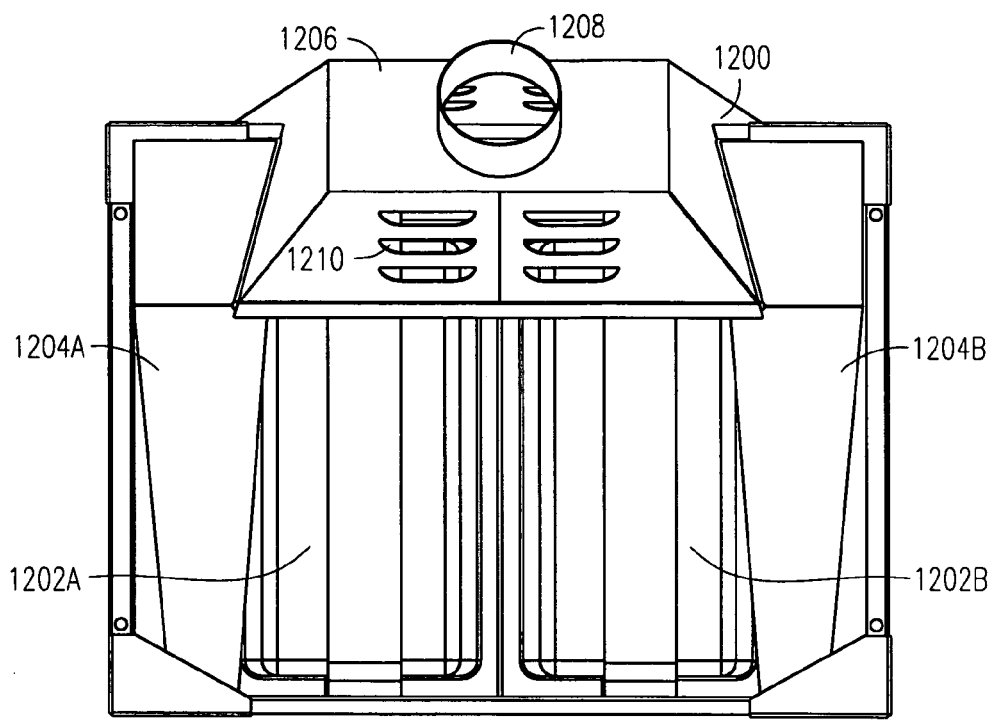
FIG. 12A is a top view of an exemplary exhaust hood.
Figure 12B:
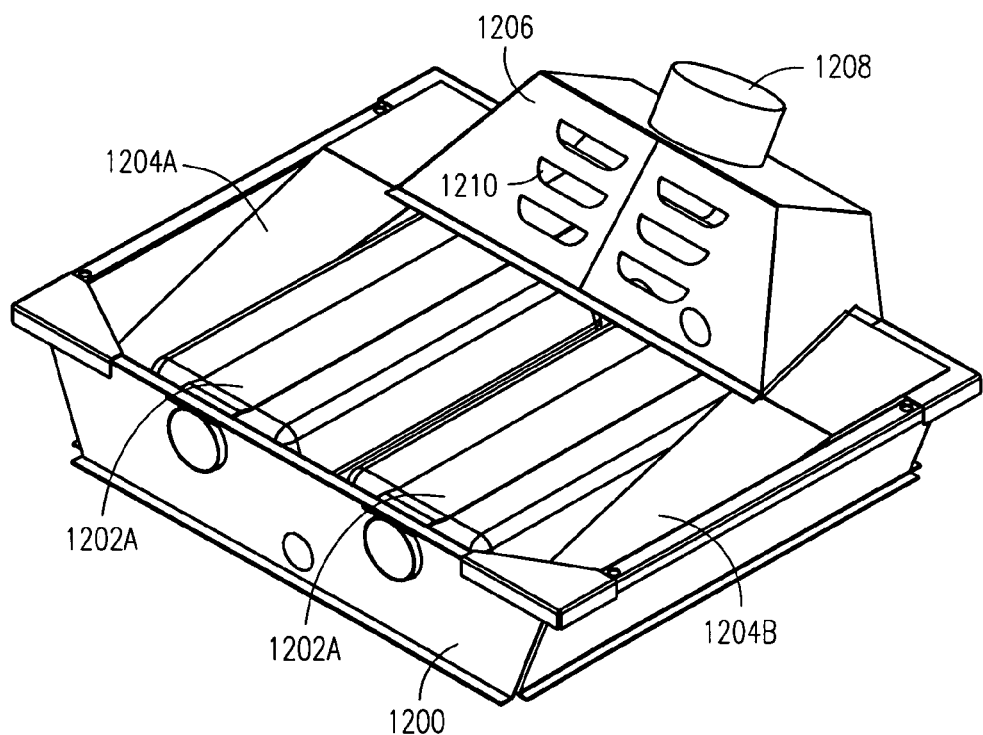
FIG. 12B is a perspective view of the exhaust hood of FIG. 12A.
Figure 12C:
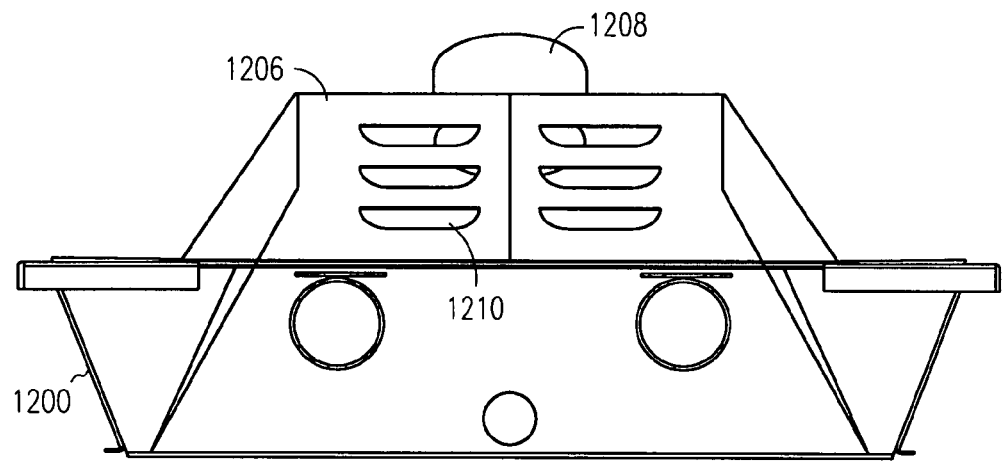
FIG. 12C is an end view of the hood of FIG. 12A, the end view being taken along the line 12C—12C in FIG. 12A.
Figure 12D:
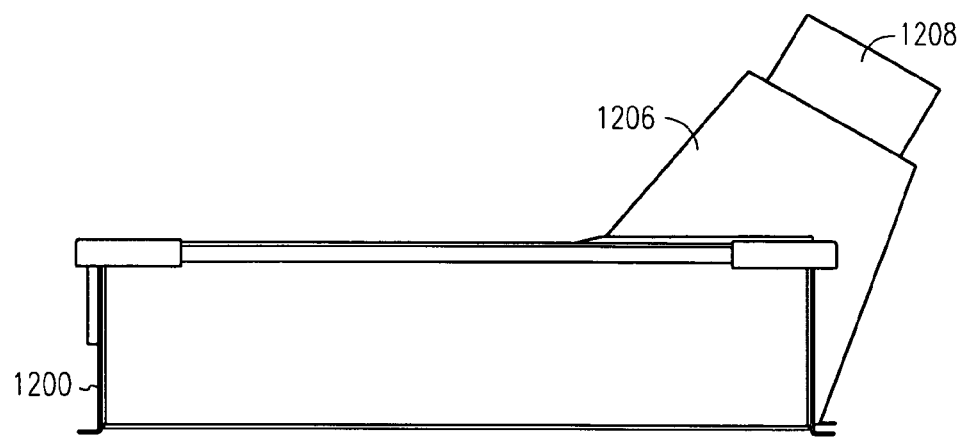
FIG. 12D is a side view of the exhaust hood of FIGS. 12A–C.

FIG. 11E depicts an example of a heater 1126 having an airflow inhibitor 1128 that includes a screen 1130 positioned in front of a radiant element surface 1132. In this example, the screen 1130 uses a mesh that is sized to impede cooling air drawn in by convection airflow.

In the various examples illustrated in FIGS. 11A–11E, the airflow inhibiter is sized and shaped and is located close enough (e.g., in contact or within about 6 inches) to the radiant element to impede cooling air drawn in to the surface of the radiant element by convection airflow. Moreover, the surface area of the particular airflow inhibitor structure that directly contacts with mobile air is subject to cooling from such directly contacted mobile air. Reducing the surface area of the airflow inhibitor structure that directly contacts the mobile air, therefore, reduces the cooling of the airflow inhibitor structure by the mobile air. The design of a particular airflow inhibitor structure will typically balance the benefit of obtaining an insulating air blanket (which increases the radiant element surface temperature) against any blocking of the radiant energy by the airflow inhibitor structure. For example, an airflow-inhibiting screen 1130 can decrease cooling air upon the face of the radiant energy source 1132 to a degree that typically depends on the wire size and mesh opening size of the screen 1130. Although an increase in wire size and a decrease in openings blocks more cooling air, it also blocks more radiant energy and, furthermore, increases the heating of the screen 1130. Instead of carrying away heat from the radiant energy element surface 1132, the cooling air carries away heat from the hotter screen, which merely moves the locus of the inefficiency away from the radiant element surface 1132 to the screen 1130. A non-heat absorbing (e.g., reflective) airflow inhibitor structure will typically stay cooler in the path of the radiant energy from the radiant energy source, and therefore lowers amount of heat lost to cooling air.

FIGS. 12A, 12B, 12C, and 12D are respective top, perspective, end, and side views of a common exhaust hood 1200 shared by two hanging or other side-by-side radiant heater units 1202A–B (or, alternatively, a single heater unit 1202). In these FIGS. 12A–12D, the dimensions are merely exemplary and provided for the reader's convenience. The hood 1200 includes sealing side panels 1204A–B that are inclined to guide heated gas up toward the manifold 1206 and the flue duct 1208. The panels 1204A–B may also be inclined to guide such heated gas back toward the heaters 1202A–B and away from the peripheral edges of the hood 1200. In this example, the manifold includes cooling louvers 1210, as discussed above. This example illustrates how the radiant sources 1212A–B are left at least partially exposed (i.e., not completely covered by the hood 1200) to prevent overheating of these sometimes temperature sensitive components. Where such temperature sensitivity is not a concern, the hood 1200 may alternatively completely cover the heaters 1202A–B.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. An apparatus comprising:
   a first radiant heating element that, in operation, produces radiant heat and also produces hot air that moves in a convection current; and
   a second radiant heating element that is positioned with respect to the first radiant heating element such that the second radiant heating element is heated by the convection current of the hot air from the first radiant heating element to produce additional radiant heat, the second radiant heating element including a series of stages operating at different temperatures resulting from serially receiving the convection current of the hot air from the first radiant heating element.

2. The apparatus of claim 1, in which the second radiant heating element includes a panel that includes at least one feature that includes a first side that is oriented toward the primary radiant heating element and a second side that is oriented away from the primary radiant heating element.

3. The apparatus of claim 2, in which the first side is more reflective than the second side.

4. The apparatus of claim 3, in which the second side includes an emissivity that radiates more heat than the first side.

5. The apparatus of claim 2, in which the at least one feature is selected from the group consisting of at least one of a ridge, a fin, a furrow, a flute, a strip, a weir, a duct, and a ripple.

6. The apparatus of claim 2, in which the at least one feature includes at least one opening sized to pass hot gas through.

7. The apparatus of claim 1, in which the second radiant heating element includes a serpentine arrangement of features.

8. A method comprising:
producing radiant heat and convected hot air using a primary radiant element; and
receiving the convected hot air to produce additional radiant heat using at least one secondary radiant heating element, the receiving carried out in multiple stages operating at different temperatures.

9. The method of claim 8, including using stages that reflect radiant heat back toward the primary radiant element.

10. The method of claim 9, including using stages that radiate heat away from the primary radiant element.

11. The method of claim 8, including guiding the convected air serially through the stages.

12. The method of claim 8, including passing hot gas through structures forming the stages.

13. The method of claim 8, including receiving the convected hot air in a serpentine fashion.

14. An apparatus comprising:
means for producing radiant heat and convected hot air using a primary radiant element; and
means for receiving the convected hot air to produce additional radiant heat using at least one secondary radiant heating element, the receiving carried out in multiple stages operating at different temperatures.

15. A method comprising:
producing radiant heat using a first radiant energy source;
positioning a second radiant energy source near the first radiant energy source to receive radiant heat from the first radiant energy source;
providing additional radiant heat from the second radiant energy source; and
blocking exhaust, using the second radiant energy source as a barrier, to help guide the exhaust toward an exhaust collector.

16. The method of claim 15, in which the positioning the second radiant energy source includes blocking substantially all the radiant heat from the first radiant energy source.

17. The method of claim 15, in which the positioning the second radiant energy source includes using a second radiant energy source of a substantially different shape than the first radiant energy source to obtain a desired effective shape from which radiant heat is provided to a desired environment.

18. The method of claim 15, in which the positioning the second radiant energy source includes positioning to reflect radiant energy back toward the first radiant energy source.

19. The method of claim 15, in which the positioning the second radiant energy source includes using a staged structure for receiving hot air convectively transported from the first radiant energy source, the stage structure including segments operating at different temperatures from each other.

20. The method of claim 15, including using the second radiant energy such that it resonates at the frequency of and in response to the radiant energy received from the first radiant energy source.

21. An apparatus comprising:
a first radiant heating element that, in operation, produces radiant heat; and
a second radiant heating element that is positioned with respect to the first radiant heating element such that the second radiant heating element is heated by the radiant heat from the first radiant heating element to produce additional radiant heat, and the second radiant heating element is positioned to act as a barrier to block exhaust to help guide exhaust toward a collector.

22. The apparatus of claim 21, in which the second radiant heating element is positioned with respect to the first radiant heating element such that substantially all of the radiant heat from the first radiant heating element is blocked by the second radiant heating element while still leaving an exhaust path for hot air from the first radiant heating element.

23. The apparatus of claim 21, in which the first radiant heating element is different in shape from the second radiant heating element such that the second radiant heating element provides a modified effective shape from which energy is radiated.

24. The apparatus of claim 21, in which the first radiant heating element includes a plurality of radiating segments, and in which the second radiant heating element includes a unitary radiating segment.

25. The apparatus of claim 21, in which the second radiant heating element includes a mantel that re-radiates in response to the radiant heat received from the first radiant heating element, the re-radiating occurring at a different frequency than the radiant heat received from the first radiant heating element.

26. An apparatus comprising:
at least one first radiant heating element that, in operation, produces radiant heat at a face of the first radiant heating element and also produces hot air that moves in a convection current; and
an airflow inhibitor, positioned near the face of the first radiant heating element, the airflow inhibitor configured to inhibit movement of the hot air convected near the face of the first radiant heating element, and the airflow inhibitor also configured to pass therethrough, re-radiated or substantially unimpeded, the radiant heat produced by the first radiant heating element.

27. The apparatus of claim 26, in which the airflow inhibitor includes an arrangement of cell-like structures that inhibit convective airflow near the face of the at least one first radiant heating element.

28. The apparatus of claim 26, in which the airflow inhibitor includes a plurality of filaments attached to or near the face of the first radiant heating element to inhibit convective airflow near the face of the first radiant heating element.

29. The apparatus of claim 26, in which the airflow inhibitor includes a material near the face of the first radiant heating element, and in which the material is substantially transparent to the radiant heat generated by the first radiant heating element.

30. The apparatus of claim 26, in which the airflow inhibitor includes a body of fibers near the face of the first radiant heating element to inhibit convective airflow near the face of the first radiant heating element.

31. The apparatus of claim 26, in which the airflow inhibitor includes a wire mesh near the face of the first radiant heating element to inhibit convective airflow near the face of the first radiant heating element.

32. A method comprising:
  producing radiant heat at a first radiant energy source; and
  inhibiting convective airflow near the first radiant energy source by placing an airflow inhibiting structure in a path of the radiant heat, in which the airflow inhibiting structure used passes radiant heat re-radiated or substantially unimpeded.

* * * * *